United States Patent
Tanaka et al.

(10) Patent No.: US 10,840,813 B2
(45) Date of Patent: Nov. 17, 2020

(54) POWER CONVERSION SYSTEM

(71) Applicant: Mitsubishi Electric Corporation, Chiyoda-ku (JP)

(72) Inventors: Miwako Tanaka, Chiyoda-ku (JP); Toshiyuki Fujii, Chiyoda-ku (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 212 days.

(21) Appl. No.: 16/301,235

(22) PCT Filed: May 12, 2017

(86) PCT No.: PCT/JP2017/018060
§ 371 (c)(1),
(2) Date: Nov. 13, 2018

(87) PCT Pub. No.: WO2017/208789
PCT Pub. Date: Dec. 7, 2017

(65) Prior Publication Data
US 2020/0274456 A1    Aug. 27, 2020

(30) Foreign Application Priority Data
Jun. 2, 2016 (JP) ................................. 2016-110744

(51) Int. Cl.
*H02M 3/335*    (2006.01)
*H02M 5/458*    (2006.01)
(Continued)

(52) U.S. Cl.
CPC ..... *H02M 3/33584* (2013.01); *H02M 5/4585* (2013.01); *H02M 7/219* (2013.01);
(Continued)

(58) Field of Classification Search
CPC ..... H02M 2001/007; H02M 2001/008; H02M 2001/0009; H02M 3/33584; H02M 7/219; H02M 7/483; H02M 5/4585
See application file for complete search history.

(56) References Cited

U.S. PATENT DOCUMENTS

2005/0105229 A1    5/2005    Deng et al.
2008/0103632 A1*   5/2008    Saban ................... H02K 21/48
                                                              700/286
(Continued)

FOREIGN PATENT DOCUMENTS

JP    7-131936 A    5/1995
JP    9-200952 A    7/1997
(Continued)

OTHER PUBLICATIONS

Extended European Search Report dated Apr. 25, 2019 in Patent Application No. 17806347.5, 10 pages.
(Continued)

*Primary Examiner* — Jue Zhang
(74) *Attorney, Agent, or Firm* — Xsensus LLP

(57) ABSTRACT

In a power conversion system in which self-excitation-type power conversion devices performing bidirectional power conversion are mutually interconnected by direct current, when the power conversion device serving for power transmission is stopped, in the first power conversion device, a DC capacitor voltage control unit calculates a current amount for compensating capacitor voltage in accordance with voltage variation in a DC capacitor. A high-voltage-side DC current control unit determines that an electricity amount supplied from a power supply system to the first power conversion device is a predetermined value or higher, and subtracts the current amount for compensating the capacitor voltage from a DC current command value. Thus, (Continued)

while the DC voltage is kept to be constant, the power flow direction is changed and power transmission to a second DC system is continued.

14 Claims, 12 Drawing Sheets

(51) Int. Cl.
*H02M 7/219* (2006.01)
*H02M 7/483* (2007.01)
*H02M 1/00* (2006.01)

(52) U.S. Cl.
CPC ...... *H02M 7/483* (2013.01); *H02M 2001/007* (2013.01); *H02M 2001/008* (2013.01); *H02M 2001/0009* (2013.01); *H02M 2007/4835* (2013.01)

(56) References Cited

U.S. PATENT DOCUMENTS

| | | | | |
|---|---|---|---|---|
| 2008/0304296 | A1* | 12/2008 | NadimpalliRaju | H02M 7/217 363/45 |
| 2010/0148578 | A1* | 6/2010 | Wagoner | H02M 7/48 307/17 |
| 2013/0128633 | A1* | 5/2013 | Ichihara | H02M 3/156 363/37 |
| 2014/0084679 | A1* | 3/2014 | Li | B60L 50/90 307/10.1 |
| 2017/0099008 | A1* | 4/2017 | Keister | H02M 5/4585 |

FOREIGN PATENT DOCUMENTS

| | | |
|---|---|---|
| JP | 3261947 B2 | 3/2002 |
| JP | 2005-224009 A | 8/2005 |

OTHER PUBLICATIONS

International Search Report dated Jul. 25, 2017 in PCT/JP2017/018060 filed May 12, 2017.

* cited by examiner

POWER CONVERSION SYSTEM

TECHNICAL FIELD

The present invention relates to a power conversion system including at least three self-excitation-type power conversion devices interconnected with each other by direct current to perform power transmission, the self-excitation-type power conversion devices each having a DC capacitor on the DC circuit side and being configured such that voltage of the DC capacitor or a synthesis value of voltage of a plurality of DC capacitors becomes voltage of DC buses. The present invention particularly relates to operation continuation control technology for continuing DC power transmission by another normal power conversion device when one of the power conversion devices is stopped.

BACKGROUND ART

A high-voltage DC power transmission system in which large-capacity power conversion devices are interconnected with each other by direct current has an advantage in terms of power transmission loss in long-distance power transmission. By interconnecting large-capacity power conversion devices by direct current and having multi-terminal configuration, it is expected that, when a power conversion device serving for power transmission is stopped, the other normal power conversion devices cover the power so as to continue power transmission.

In a multi-terminal DC power transmission system in which a plurality of power conversion devices are interconnected with each other by a DC system, normally, one power conversion device on the power-transmitting side controls system voltage in DC power transmission and the other power conversion devices on the power-receiving side control current in DC power transmission, or power.

In this case, if the power conversion device on the power-transmitting side controlling system voltage in DC power transmission is stopped, voltage in DC power transmission varies. In order to prevent the voltage variation and continue operation by the other normal power conversion devices, it is necessary to suppress voltage variation in the DC power transmission system and cover the power by the normal power conversion devices.

In conventional technology, in a DC power transmission system in which a plurality of AC/DC power conversion devices are connected via a DC circuit, and in a control device therefor, the following method is disclosed. When the power conversion device on the power-transmitting side is stopped, on the basis of a difference between a set value of active power to be covered and a detection value of active power, or by adding a value proportional to the magnitude of the deviation when the detection value of active power deviates from a predetermined range, a control device of another normal AC/DC power conversion device corrects a DC voltage command value of a DC power transmission system, and performs control so that the corrected DC voltage command value becomes equal to the DC voltage detection value (see, for example, Patent Document 1 below).

In another conventional technology, in a DC power transmission system in which self-excitation-type power conversion devices are connected to a DC power transmission system, the self-excitation-type power conversion device is disclosed as follows. The self-excitation-type power conversion device includes: DC voltage control means for keeping voltage of the DC system at a constant value; active power control means for controlling so as to keep active power of the power conversion device at a constant value; and reactive power control means for keeping reactive power on the AC side of the power conversion device to be constant, and further includes power margin setting means for increasing, by a power margin, a power command value of an active power control circuit for controlling DC voltage of the DC power transmission system (see, for example, Patent Document 2 below).

CITATION LIST

Patent Document

Patent Document 1: Japanese Laid-Open Patent Publication No. 1997-200952
Patent Document 2: Japanese Patent No. 3261947

SUMMARY OF THE INVENTION

Problems to be Solved by the Invention

In the power conversion device described in Patent Document 1, when the power conversion device on the power-transmitting side controlling DC voltage is stopped, as described above, on the basis of a difference between a set value of active power to be covered and the detection value of active power, or by adding a value proportional to the magnitude of a deviation when the active power detection value deviates from a predetermined range, a control device of another normal AC/DC power conversion device corrects a DC voltage command value of a DC power transmission system. Therefore, the normal power conversion device changes the DC voltage command value for controlling voltage of DC power transmission, and the operation is continued.

Thus, the normal power conversion device controls DC voltage in accordance with a difference between the changed DC voltage command value and the DC voltage detection value. Therefore, the DC voltage operation range to be supported by the power conversion device is expanded, and there is a problem that it is necessary to increase the size of the power conversion device.

In the power conversion devices described in Patent Document 2, when a plurality of power conversion devices performing inverter operation are interconnected with each other, DC voltage command values for the plurality of power conversion devices are set to be lower than a DC voltage command value for an order conversion device, and the DC voltage command values are set to be different from each other.

Therefore, when the order conversion device serving for power transmission is stopped, one self-excitation-type power conversion device having a next lower DC voltage command value among the conversion devices performing inverter operations serves as an order conversion device to control DC voltage, and thus the DC voltage command value changes after the order conversion device is stopped. Also in this case, as in Patent Document 1, in order to continue power transmission by a normal AC/DC power conversion device, the operation range of DC power transmission voltage is expanded and therefore it is necessary to increase the size of the power conversion device.

The present invention has been made to solve the above problems, and an object of the present invention is to provide a power conversion system including at least three self-excitation-type power conversion devices interconnected with each other to perform DC power transmission, the self-excitation-type power conversion devices each having a DC capacitor on the DC circuit side and being configured such that voltage of the DC capacitor or a synthesis value of voltages of a plurality of DC capacitors becomes voltage of DC buses. And the power conversion system is capable of, when the power conversion device on the power-transmitting side is stopped, continuing operation by suppressing variation in DC voltage by another normal power conversion device, further it is not necessary to increase the size of the power conversion device by preventing the operation range of the DC voltage from expanding.

Means of Solution to the Problems

The present invention is a power conversion system including at least three self-excitation-type power conversion devices each having self-extinguishing type semiconductor switching elements and performing, in a bidirectional manner, one of conversion between AC power and DC power and conversion between DC power and DC power, the at least three self-excitation-type power conversion devices being interconnected with each other via DC buses by direct current in order to perform power transmission. In the power conversion system, when a main power conversion devices that is connected to a main power supply system and serves for power supply and voltage control has stopped operation, a first power conversion device connected to other power supply system other than the main power supply system among the remaining power conversion devices supplies power to a load system, in place of the main power conversion device that has stopped operation. The first power conversion device connected to the other power supply system includes: a power converter in which one of a voltage value of a capacitor connected between the DC buses and a synthesis value of voltage of a plurality of DC capacitors connected between the DC buses is kept at constant DC voltage; and a control device for controlling operation of the power converter. The control device includes: a DC current detection unit for detecting DC current flowing through the DC buses; a DC capacitor voltage detection unit for detecting voltage of the DC capacitor; a DC capacitor voltage control unit which performs control so that the DC capacitor voltage detected by the DC capacitor voltage detection unit follows a DC voltage command value, and calculates a DC current control amount for controlling the DC capacitor voltage; a DC current control unit for performing control so that the DC current detected by the DC current detection unit follows a DC current command value, on the basis of the DC current control amount calculated by the DC capacitor voltage control unit; a DC voltage control unit for performing control so that voltage of the DC buses follows the DC voltage command value; and a voltage command distribution unit for driving the self-extinguishing type semiconductor switching elements on the basis of the DC voltage command value and the DC current command value. When variation in the DC capacitor voltage and stop of operation of the main power conversion device serving for power supply and voltage control are detected, by the DC capacitor voltage control unit and one of the DC current control unit and the DC voltage control unit, charge/discharge current of the DC capacitor voltage is compensated and a DC power transmission current amount is adjusted in accordance with an electricity amount supplied from the other power supply system.

Effect of the Invention

In the power conversion system according to the present invention, when a power conversion device on the power transmitting end side is stopped and the DC voltage varies, it is possible to perform power transmission by power flow change while keeping the DC voltage to be constant, using another normal power conversion device. Thus, operation continuity can be enhanced. Also, at this time, the operation range of the DC voltage can be prevented from expanding, whereby an effect of eliminating the need for increasing the size of the power conversion device can be obtained.

EMBODIMENTS FOR CARRYING OUT THE INVENTION

Embodiment 1

Hereinafter, a power conversion system according to embodiment 1 of the present invention will be described with reference to FIG. 1 to FIG. 4.

Figure 1:
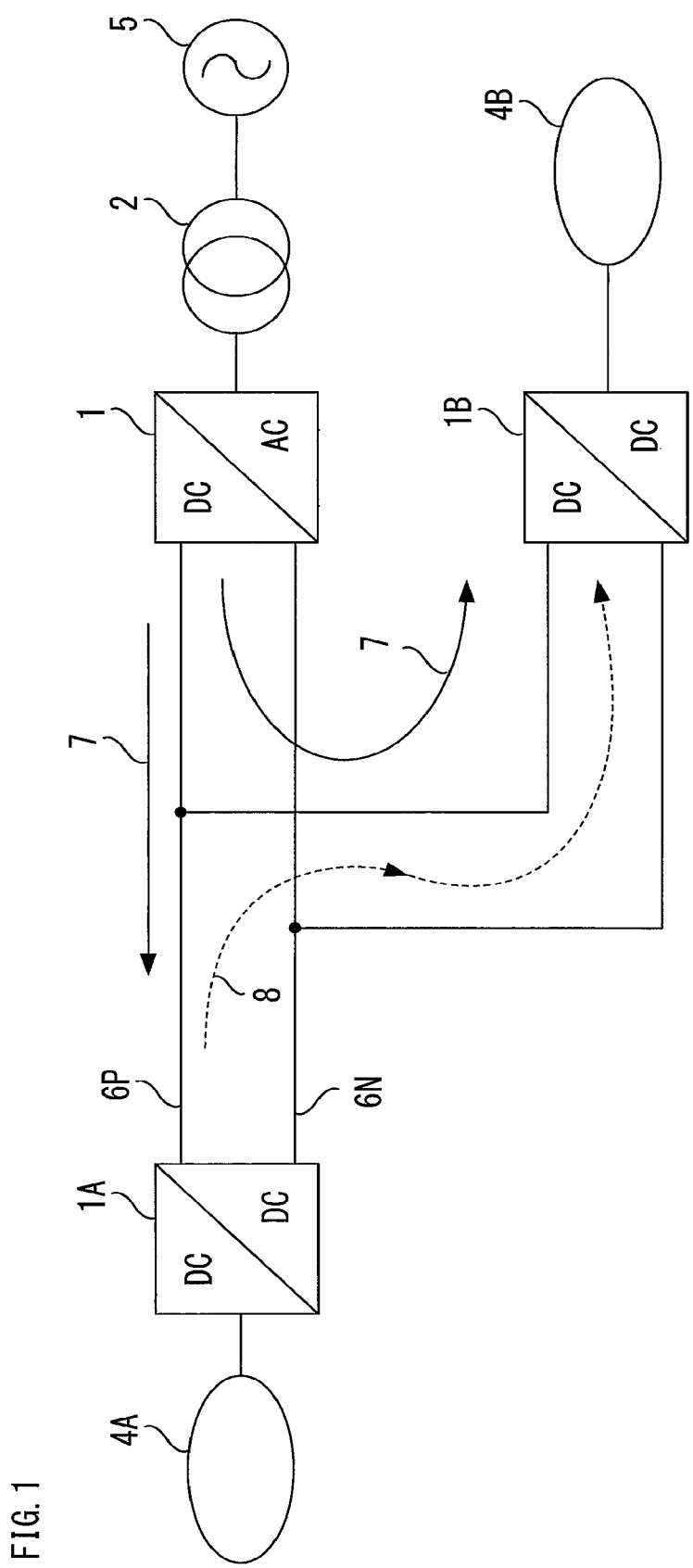
FIG. 1 is a configuration diagram showing the entirety of a power conversion system according to embodiment 1 of the present invention.
Figure 2:
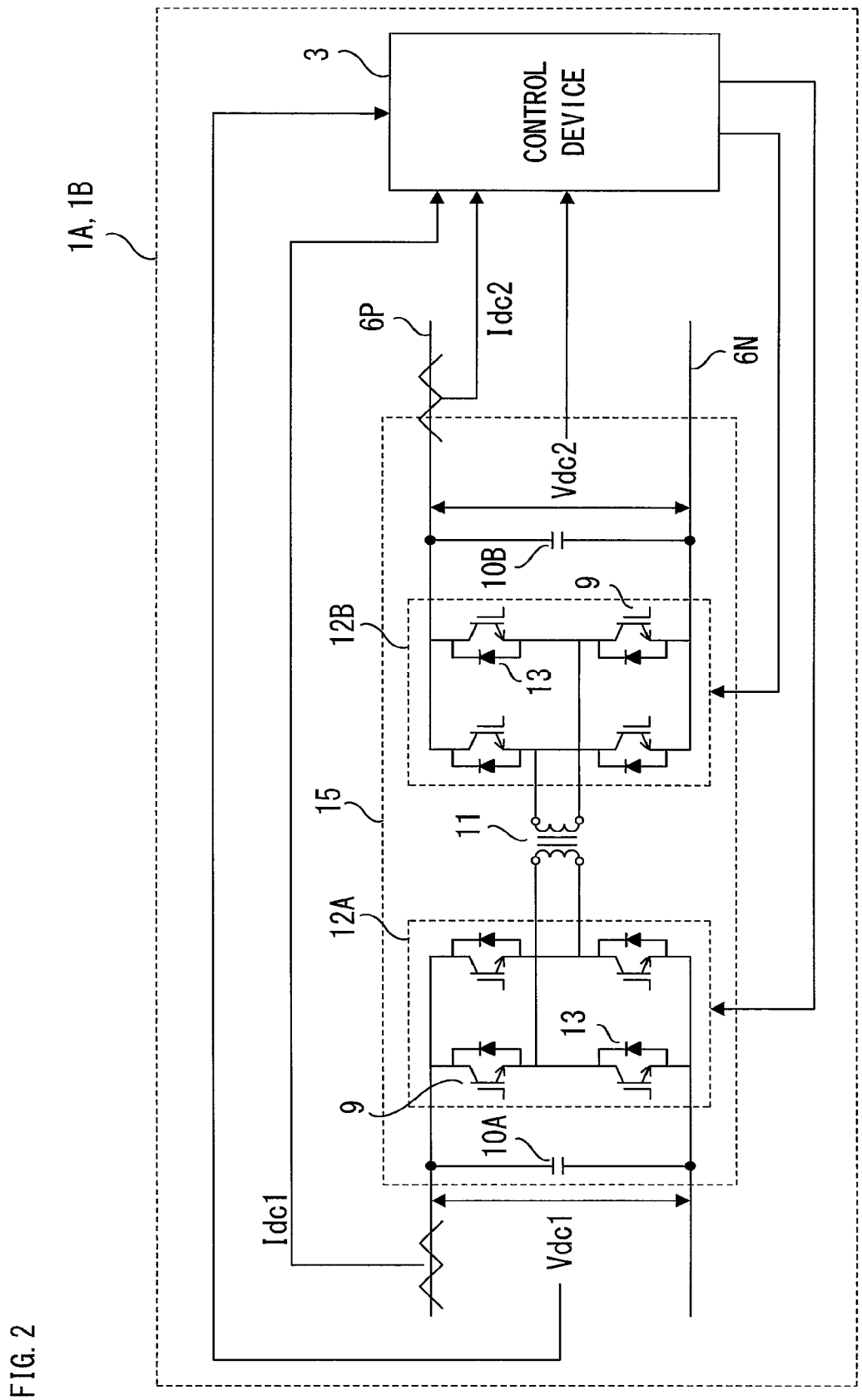
FIG. 2 is a configuration diagram of a self-excitation-type DC/DC power conversion device composing the power conversion system according to embodiment 1 of the present invention.

FIG. 1 is a configuration diagram showing the entirety of the power conversion system according to embodiment 1 of the present invention, and FIG. 2 is a configuration diagram of a self-excitation-type DC/DC power conversion device composing the power conversion system according to embodiment 1 of the present invention.

The power conversion system according to embodiment 1 of the present invention includes: a self-excitation-type DC/AC power conversion device 1 for converting AC power to DC power; and two of a first DC/DC power conversion device 1A and a second DC/DC power conversion device 1B which are self-excitation type and convert DC power to DC power having different voltage.

In the DC/AC power conversion device 1, an AC terminal on one side is connected to an AC power supply system 5 via a transformer 2, and DC terminals on the other side are connected to DC buses 6P, 6N. In the first DC/DC power conversion device 1A and the second DC/DC power conversion device 1B, terminals on one side are connected to the DC buses 6P, 6N, and terminals on the other side are respectively connected to a first DC system 4A and a second DC system 4B. In this case, the first DC system 4A connected to the first DC/DC power conversion device 1A includes a DC power supply system, and the second DC system 4B connected to the second DC/DC power conversion device 1B is a system mainly including a load.

In normal power transmission, voltage of the AC power supply system 5 is transformed by the transformer 2, AC power supplied from the AC power supply system 5 is converted to DC power by the DC/AC power conversion device 1, and then the resultant power is transmitted in a power flow direction 7 indicated by solid lines in FIG. 1. It is noted that the AC power supply system 5 and the DC/AC power conversion device 1 in the present embodiment respectively correspond to a main power supply system and a main power conversion device in claims.

The power from the DC/AC power conversion device 1 is transmitted through the DC buses 6P, 6N to the first DC/DC power conversion device 1A and the second DC/DC power conversion device 1B, and voltages of the transmitted powers are respectively transformed to DC voltages lower than DC voltage between the DC buses 6P and 6N by the first DC/DC power conversion device 1A and the second DC/DC power conversion device 1B. Then, the resultant powers are supplied to the first DC system 4A and the second DC system 4B.

Next, the first DC/DC power conversion device 1A and the second DC/DC power conversion device 1B will be described with reference to FIG. 2.

Here, each of the first DC/DC power conversion device 1A and the second DC/DC power conversion device 1B which are self-excitation type decreases DC voltage Vdc2 so as to be converted to DC voltage Vdc1. It is noted that the DC voltage Vdc2 is referred to as high-voltage-side DC voltage and the DC voltage Vdc1 is referred to as low-voltage-side DC voltage.

The first DC/DC power conversion device 1A and the second DC/DC power conversion device 1B basically have the same configuration and are respectively composed of a DC/DC power converter 15 and a control device 3 for controlling the DC/DC power converter 15. The DC/DC power converter 15 is a so-called bidirectional isolation-type DC/DC power conversion device (dual active bridge (DAB) type) which is composed of: a full-bridge inverter 12A on the low-voltage side; a full-bridge inverter 12B on the high-voltage side; a low-voltage-side DC capacitor 10A connected to the full-bridge inverter 12A on the low-voltage side; a high-voltage-side DC capacitor 10B connected to the full-bridge inverter 12B on the high-voltage side; and an isolation transformer 11 connected between AC-side terminals of the full-bridge inverter 12A on the low-voltage side and AC-side terminals of the full-bridge inverter 12B on the high-voltage side. In the control method for the first DC/DC power conversion device 1A and the second DC/DC power conversion device 1B, the duty ratio of pulse width modulation (PWM) gate drive is fixed at 50%, and by using the phase of one of the full-bridge inverters on the primary side and the secondary side of the isolation transformer 11 as a reference, the phase of the other full-bridge inverter is shifted, whereby DC voltage on one side is controlled.

Each of the full-bridge inverter 12A on the low-voltage side and the full-bridge inverter 12B on the high-voltage side includes semiconductor switching elements 9 and diodes 13 connected in parallel to the semiconductor switching elements 9. Here, insulated gate bipolar transistors (IGBT) are used as the semiconductor switching elements 9. However, without limitation thereto, other self-extinguishing type semiconductor switching elements may be used.

During normal power transmission, the high-voltage-side DC voltage Vdc2 is controlled to be constant by the DC/AC power conversion device 1. Therefore, the high-voltage-side DC voltage Vdc2 is voltage between the DC buses 6P and 6N. In addition, during normal power transmission, in each of the first DC/DC power conversion device 1A and the second DC/DC power conversion device 1B, the control device 3 detects current and voltage of the DC/DC power converter 15 and controls the low-voltage-side DC voltage Vdc1 so as to be constant. In the description below, the first DC/DC power conversion device 1A is focused on and the function thereof will be described, but also the second DC/DC power conversion device 1B basically has the same function.

Figure 3:
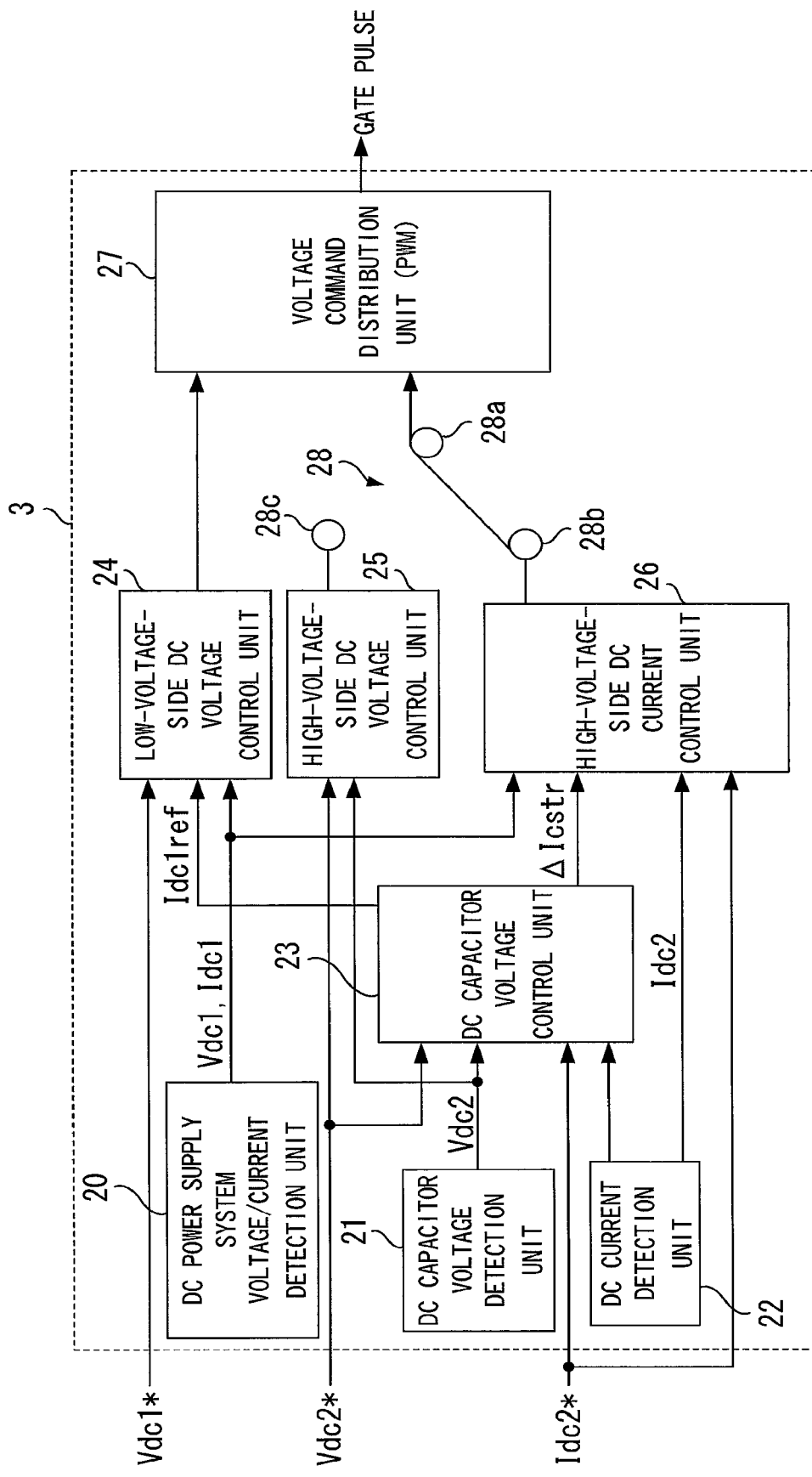
FIG. 3 is a block diagram showing a function of a control device of the power conversion device according to embodiment 1 of the present invention.

FIG. 3 is a block diagram showing the function of the control device 3 in the first DC/DC power conversion device 1A. As described above, the function of the control device 3 in the second DC/DC power conversion device 1B is also shown by the same block diagram.

During normal power transmission, the control device 3 of the first DC/DC power conversion device 1A detects low-voltage-side DC voltage Vdc1 and low-voltage-side DC current Idc1 of the DC system 4A by a DC power supply system voltage/current detection unit 20. On the basis of the low-voltage-side DC voltage Vdc1 and the low-voltage-side DC current Idc1 detected by the DC power supply system voltage/current detection unit 20 and a low-voltage-side DC current command value Idc1ref outputted from a DC capacitor voltage control unit 23, a low-voltage-side DC voltage control unit 24 performs feedback control about a difference ΔVdc1 between a low-voltage-side DC voltage command value Vdc1* and the low-voltage-side DC voltage detection value Vdc1, by using the phase of a gate signal given to the full-bridge inverter 12B on the high-voltage side as a reference, thereby a phase difference with respect to the voltage difference ΔVdc1 is calculated. Then, a voltage command distribution unit 27 shifts gate signals for the semiconductor switching elements 9 of the full-bridge inverter 12A on the low-voltage side by the phase difference, thereby the low-voltage-side DC voltage Vdc1 is kept to be constant. As used herein, an electricity amount is represented by a ratio with respect to a reference value, and command values for voltage, current, and the like and detection values thereof are expressed by per unit method.

It is noted that, since the high-voltage-side DC voltage Vdc2 is controlled by the DC/AC power conversion device 1, a high-voltage-side DC voltage control unit 25 does not function during normal power transmission. A common contact 28a of a changeover switch 28 is connected to an individual contact 28b on the high-voltage-side DC current control unit 26 side.

A DC capacitor voltage detection unit 21 detects high-voltage-side DC capacitor voltage which is voltage of the high-voltage-side DC capacitor 10B, as the high-voltage-side DC voltage Vdc2. Therefore, here, the high-voltage-side DC capacitor voltage detected by the DC capacitor voltage detection unit 21 is denoted by the same Vdc2.

The DC capacitor voltage control unit 23 performs feedback control according to a difference between a high-voltage-side DC voltage command value Vdc2* and the high-voltage-side DC capacitor voltage Vdc2, thereby calculates error current ΔIcstr, and outputs the error current ΔIcstr.

The error current ΔIcstr occurs when the high-voltage-side DC voltage Vdc2 varies. In a steady state, input current and output current of the high-voltage-side DC capacitor 10B are equal to each other and therefore the error current ΔIcstr is equal to 0. However, if an input/output power balance is lost at the time of fault, the high-voltage-side DC capacitor 10B is charged or discharged and thus a difference between input current and output current is detected as the error current ΔIcstr.

The DC capacitor voltage control unit 23 performs feedforward control according to a sum of the error current ΔIcstr and a high-voltage-side DC current command value Idc2*, whereby a low-voltage-side DC current command value Idc1ref is obtained. And the DC capacitor voltage control unit 23 outputs the low-voltage-side DC current command value Idc1ref to the low-voltage-side DC voltage control unit 24. In this way, feedforward control according to the high-voltage-side DC current command value Idc2* is performed by using the error current ΔIcstr, whereby disturbance responsiveness with respect to the high-voltage-side DC voltage Vdc2 is enhanced.

The low-voltage-side DC current Idc1 and the low-voltage-side DC voltage Vdc1 detected by the DC power supply system voltage/current detection unit 20, the error current ΔIcstr, the DC current Idc2 detected by a DC current detection unit 22, and the high-voltage-side DC current command value Idc2* are all inputted to the high-voltage-side DC current control unit 26.

The high-voltage-side DC current control unit 26 subtracts the error current ΔIcstr which is a current amount needed in order to charge or discharge the high-voltage-side DC capacitor 10B, from the high-voltage-side DC current command value Idc2*, thereby a new high-voltage-side DC current command value Idc2* is calculated. Then, the high-voltage-side DC current control unit 26 performs feedback control according to a difference ΔIdc2 between the new high-voltage-side DC current command value Idc2* and the high-voltage-side DC current Idc2, thereby the high-voltage-side DC current control unit 26 performs control so that the high-voltage-side DC current Idc2 to be transmitted follows the high-voltage-side DC current command value Idc2*. And the high-voltage-side DC current command value Idc2* is outputted to the voltage command distribution unit 27. The voltage command distribution unit 27 performs voltage command distribution (PWM) of the DC current command value Idc2*, thereby gate signals for driving the semiconductor switching elements 9 are generated.

Here, if the DC/AC power conversion device 1 having served for power transmission is stopped, power is no longer supplied from the DC/AC power conversion device 1 and the high-voltage-side DC voltage Vdc2 of the high-voltage-side DC capacitor 10B of the first DC/DC power conversion device 1A is reduced. Further, control of the high-voltage-side DC voltage Vdc2 by the DC/AC power conversion device 1 is stopped, and therefore, during a period until a high-rank system control device detects the stop of the DC/AC power conversion device 1 and newly outputs a DC voltage control command to another power conversion device, the high-voltage-side DC voltage Vdc2 is not temporarily controlled, so that the high-voltage-side DC voltage Vdc2 easily varies.

That is, when the stop of the DC/AC power conversion device 1 is detected, a high-rank control system (not shown) for the system eventually outputs a control switching command to another normal power conversion device (here, the first DC/DC power conversion device 1A), and accordingly, the first DC/DC power conversion device 1A is switched to serve for DC voltage control. However, some time period is required until the switching, and therefore, during this period, the high-voltage-side DC voltage Vdc2 is reduced, and further, operation might be stopped.

In order to avoid such a situation and continue operation, it is necessary that, during a period until the high-rank control system outputs a control switching command to the first DC/DC power conversion device 1A or the second DC/DC power conversion device 1B and the normal first DC/DC power conversion device 1A is switched to serve for DC voltage control, the high-voltage-side DC voltage Vdc2 is kept to be constant and the power flow direction is changed from the first DC system 4A to the second DC system 4B as indicated by a broken line 8 in FIG. 1, and it is necessary to continue the power transmission to the second DC system 4B temporarily.

Figure 4:
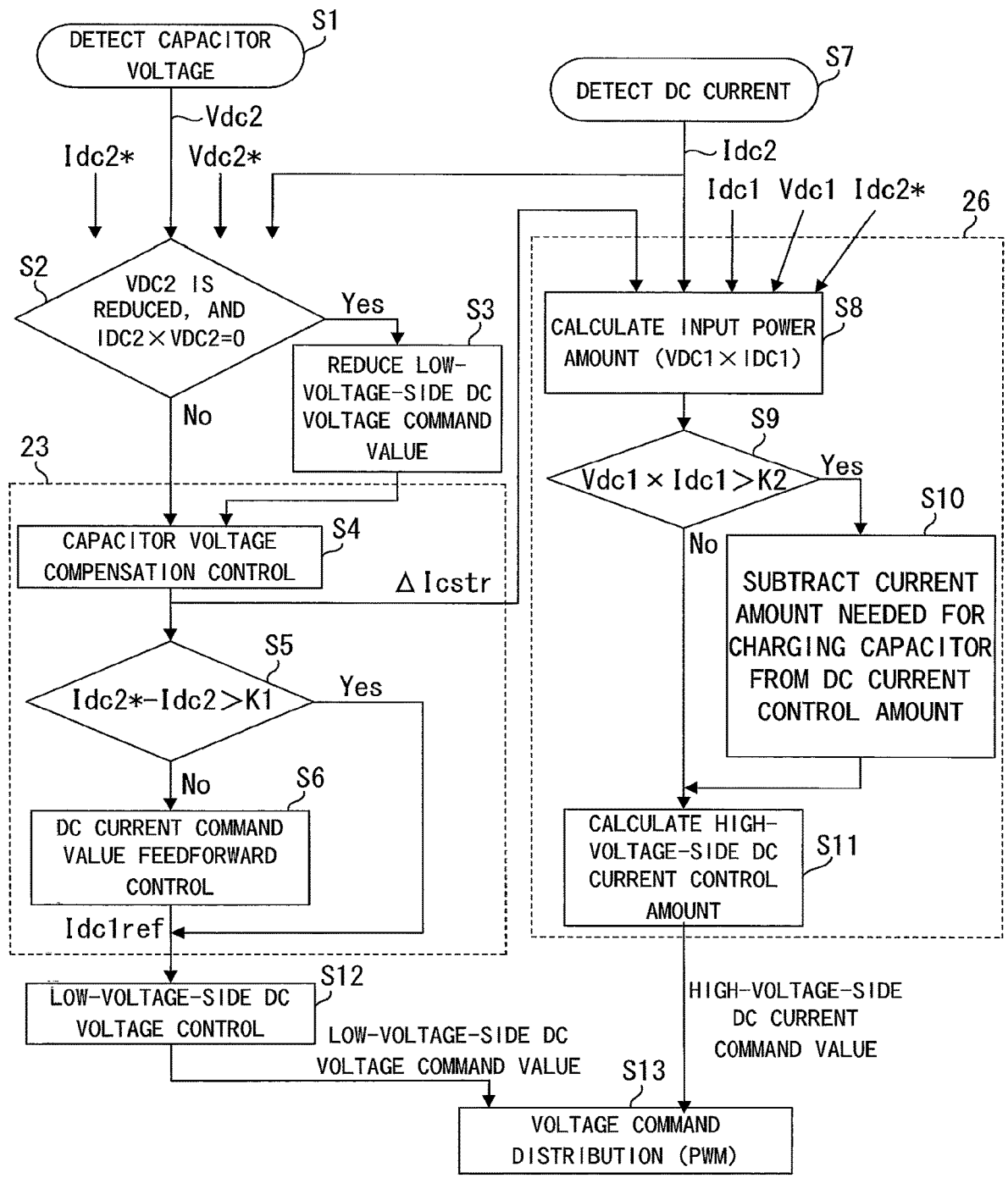
FIG. 4 is a control flowchart showing control operation of the control device of the power conversion device according to embodiment 1 of the present invention.

Here, with reference to a control flowchart shown in FIG. 4, description will be given about control operations of the low-voltage-side DC voltage control unit 24, the DC capacitor voltage control unit 23, and the high-voltage-side DC current control unit 26 composing the control device 3 of the first power conversion device 1A during a period (hereinafter, referred to as transient period) until power flow is changed to the power flow direction 8 indicated by the broken line in FIG. 1 and the high-voltage-side DC voltage control unit 25 of the first DC/DC power conversion device 1A is switched so as to control the high-voltage-side DC voltage Vdc2, when the DC/AC power conversion device 1 having served for power transmission has stopped the power transmission. In FIG. 4, reference character S denotes a processing step.

First, the DC capacitor voltage detection unit 21 detects high-voltage-side DC voltage (high-voltage-side DC capacitor voltage) Vdc2 (step S1).

Whether or not the high-voltage-side DC voltage Vdc2 has been reduced by approximately 10% or more of the rated voltage and (high-voltage-side DC current Idc2)×(high-voltage-side DC voltage Vdc2)=0 (zero) is satisfied, is determined (step S2).

In the case of Yes in step 2, i.e., if the amount of power flowing from the high-voltage side of the first DC/DC power conversion device 1A has become zero, the low-voltage-side DC voltage command value Vdc1* is reduced so as to be lower than the low-voltage-side DC voltage Vdc1 of the first DC system 4A (step S3). Thus, power flows into the first DC/DC power conversion device 1A from the first DC system 4A, and power flow is changed from the power flow direction 7 indicated by the solid line in FIG. 1 to the power flow direction 8 indicated by the broken line.

When the high-voltage-side DC capacitor voltage Vdc2 has not reduced or power is being supplied from the AC power supply system 5, it is determined that normal power transmission is being performed. And the low-voltage-side DC voltage command value Vdc1* remains constant and power flow is not changed.

Next, the DC capacitor voltage control unit 23 performs capacitor voltage compensation control (step S4). In this control, feedback control is performed on the basis of a difference between the high-voltage-side DC voltage command value Vdc2* and the high-voltage-side DC voltage Vdc2, thereby control is performed so that the high-voltage-side DC voltage Vdc2 follows the high-voltage-side DC voltage command value Vdc2*. The error current ΔIcstr calculated at this time is outputted to the high-voltage-side DC current control unit 26.

Next, the DC capacitor voltage control unit 23 compares the high-voltage-side DC current command value Idc2* with the high-voltage-side DC current Idc2, and determines whether or not a difference therebetween is greater than a predetermined value K1 (a value can be considered that power flow has sharply changed, e.g., 50% to 70%) (step S5).

If the difference between the high-voltage-side DC current command value Idc2* and the high-voltage-side DC current Idc2 is equal to or smaller than the predetermined value K1, feedforward control according to the high-voltage-side DC current command value Idc2* is performed by using the error current ΔIcstr, thereby the low-voltage-side DC current command value Idc1ref is generated (step S6).

On the other hand, while the DC/AC power conversion device 1 is stopped, if the difference between the high-voltage-side DC current command value Idc2* and the high-voltage-side DC current Idc2 has become greater than the predetermined value K1, the process shown in step S6 is not performed and feedforward control according to the high-voltage-side DC current command value Idc2* by using the error current ΔIcstr is stopped.

The reason is as follows. In a state immediately after the DC/AC power conversion device 1 is stopped, DC current Idc2 does not flow into the high-voltage side of the first DC/DC power conversion device 1A, and thus the difference between the high-voltage-side DC current command value Idc2* and the high-voltage-side DC current Idc2 increases so that these values deviate from each other by approximately 70% or more. In the deviated state, if feedforward control according to the high-voltage-side DC current command value Idc2* is performed by using the error current ΔIcstr, an effect of enhancing disturbance responsiveness of the high-voltage-side DC voltage Vdc2 is not obtained and a DC capacitor voltage control limiter is exerted, and instability of the high-voltage-side DC voltage Vdc2 is caused.

Therefore, in order to stabilize the high-voltage-side DC voltage Vdc2 and continue operation, the predetermined value K1 is set at 50% to 70%, and if the difference between the high-voltage-side DC current command value Idc2* and the high-voltage-side DC current Idc2 becomes greater than K1, the low-voltage-side DC current command value Idc1ref is newly calculated without performing the feedforward control according to the high-voltage-side DC current command value Idc2* by using the error current ΔIcstr.

The low-voltage-side DC voltage control unit 24 calculates, as a control amount, the low-voltage-side DC voltage command value Vdc1* according to the new low-voltage-side DC current command value Idc1ref (step S12), and accordingly, the voltage command distribution unit 27 generates gate signals by voltage command distribution (PWM) (step S13).

Thus, it is possible to output the low-voltage-side DC current command value Idc1ref so as to gradually change the DC current direction from the power flow direction 7 indicated by the solid line in FIG. 1 to the power flow direction 8 indicated by the broken line, while keeping the high-voltage-side DC voltage Vdc2 to be stable in the first DC/DC power conversion device 1A.

Next, description will be given about control operation of the high-voltage-side DC current control unit 26 for controlling the high-voltage-side DC current Idc2 so as to keep the high-voltage-side DC voltage Vdc2 to be constant after power flow is changed to the power flow direction 8 indicated by the broken line in FIG. 1 when the DC/AC power conversion device 1 has stopped power transmission.

The DC current detection unit 22 detects high-voltage-side DC current Idc2 flowing through the DC bus 6P (step S7). The high-voltage-side DC current control unit 26 receives the high-voltage-side DC current Idc2 detected in step S7, the low-voltage-side DC current Idc1 and the low-voltage-side DC voltage Vdc1 detected by the DC power supply system voltage/current detection unit 20, the high-voltage-side DC current command value Idc2*, and the error current ΔIcstr outputted from the DC capacitor voltage control unit 23. Then, on the basis of the low-voltage-side DC current Idc1 and the low-voltage-side DC voltage Vdc1 detected by the DC power supply system voltage/current detection unit 20, the high-voltage-side DC current control unit 26 calculates the power amount inputted from the first DC system 4A to the first DC/DC power conversion device 1A (step S8).

Next, the high-voltage-side DC current control unit 26 determines whether or not the power amount received from the first DC system 4A is greater than a predetermined value K2 (corresponding to the case where the power amount supplied from the first DC system 4A to the load is sufficiently large, i.e., approximately 90% of the power amount required for the load) (step S9).

If the power amount received from the first DC system 4A is greater than the predetermined value K2, the error current ΔIcstr which is a current amount needed in order to charge the high-voltage-side DC capacitor 105 is subtracted from the high-voltage-side DC current command value Idc2* (step S10), and the resultant value is calculated as a new high-voltage-side DC current command value Idc2* (step S11). Then, feedback control is performed according to a difference between the new high-voltage-side DC current command value Idc2* and the high-voltage-side DC current Idc2, thereby control is performed so that the high-voltage-side DC current Idc2 to be transmitted follows the high-voltage-side DC current command value Idc2*, and the high-voltage-side DC current command value Idc2* is outputted to the voltage command distribution unit 27.

In this case, if the error current ΔIcstr is sharply subtracted from the high-voltage-side DC current command value Idc2*, variation in the high-voltage-side DC current Idc2 might become great. Therefore, the subtraction is performed so that the value of the error current ΔIcstr is gently varied from 0% to 100% over a certain time period.

On the other hand, as a result of the determination in step S9, if the power amount received from the first DC system 4A is equal to or smaller than the predetermined value K2, the high-voltage-side DC current control unit 26 does not perform the process of step S10 and does not subtract the error current ΔIcstr from the high-voltage-side DC current command value Idc2*. Thus, a situation in which a balance is made with the high-voltage-side DC current command value Idc2* keeping to be zero is avoided, power flow can be stably changed, and operation can be continued.

That is, as described above, when the DC/AC power conversion device 1 is stopped, power is gradually supplied from the first DC system 4A by change of power flow. Therefore, at a stage in which the amount of power flowing from the first DC system 4A is small, if the error current ΔIcstr which is a current amount for compensating the high-voltage-side DC voltage Vdc2 is subtracted from the high-voltage-side DC current command value Idc2*, the high-voltage-side DC current amount Idc2 and the current amount (error current) ΔIcstr for charging the high-voltage-side DC capacitor 10B become equal to each other, that is, the new high-voltage-side DC current command value Idc2* becomes zero, so that the high-voltage-side DC current Idc2 might not flow in the power flow direction 8 indicated by the broken line in FIG. 1.

In view of the above, in order to continue power transmission while power flow is inverted, when the power amount from the first DC system 4A has become large enough to be supplied to the load (YES in step S9), the error current ΔIcstr is gently subtracted from the high-voltage-side DC current command value Idc2* from 0% to 100% in the process of step S10. Thus, it is possible to continue power transmission stably.

Then, the voltage command distribution unit 27 performs voltage command distribution (PWM) of the DC current command value Idc2* obtained in the above step S11, thereby gate signals for driving the semiconductor switching elements 9 is generated (step S13).

Here, the power amount is calculated in the process of step S8, and determination is performed by comparing the power amount with the predetermined value K2 in step S9. However, the determination may be performed by comparing the current amount with the predetermined value K2, instead of the power amount.

According to the above control flow, regarding voltage reduction in the case of not being accompanied by power flow change, when the high-voltage-side DC voltage Vdc2 is temporarily reduced, the DC capacitor voltage control unit 23 performs feedforward control according to the sum of the high-voltage-side DC current command value Idc2* and the current amount (error current) ΔIcstr needed in order to charge the high-voltage-side DC capacitor 10B, whereby it is possible to swiftly suppress variation in the high-voltage-side DC voltage Vdc2 in the case of temporary voltage reduction.

Regarding voltage reduction in the case of being accompanied by power flow change, a difference between the high-voltage-side DC current Idc2 and the high-voltage-side DC current command value Idc2* becomes greater than the predetermined value K1, and in this case, the low-voltage-side DC current command value Idc1ref is calculated without performing feedforward control according to the high-voltage-side DC current command value Idc2* by using the error current ΔIcstr, thereby the reduction of the high-voltage-side DC voltage Vdc2 is compensated. Thus, an appropriate current amount is synthesized as the low-voltage-side DC current command value Idc1ref, variation in the high-voltage-side DC voltage Vdc2 is suppressed, and power transmission can be continued stably.

In addition, in the case of being accompanied by power flow change, the high-voltage-side DC current control unit 26 performs control such that, if the amount of power flowing from the first DC system 4A to the first DC/DC power conversion device 1A is small, the error current ΔIcstr is not subtracted from the high-voltage-side DC current command value Idc2*. Thus, a situation in which a balance is made with the DC current command value Idc2* keeping to be zero is avoided, power flow can be changed stably, and operation can be continued.

Eventually, the control device in the high-rank system (not shown) outputs a command for switching to DC voltage control, to the control device 3 of the first DC/DC power conversion device 1A, and accordingly, the common contact 28a of the changeover switch 28 is switched so as to be connected to the individual contact 28c connected to the high-voltage-side DC voltage control unit 25, whereby the high-voltage-side DC voltage control unit 25 controls the high-voltage-side DC voltage Vdc2 so as to keep the high-voltage-side DC voltage Vdc2 to be constant.

As described above, according to the present embodiment 1, in the power conversion system in which the self-excitation-type power conversion devices 1, 1A, 1B for performing bidirectional power conversion are interconnected with each other by direct current, when the DC/AC power conversion device 1 serving for power transmission and performing DC voltage control is stopped, during the transient period until the DC voltage control is transferred to the other normal first DC/DC power conversion device 1A, the first DC/DC power conversion device 1A suppresses variation in the high-voltage-side DC voltage Vdc2 and controls the DC voltage to be constant. Thus, it is possible to stably continue power transmission from the first DC system 4A as a DC power supply to the second DC system 4B as a load by the first DC/DC power conversion device 1A.

Embodiment 2

Figure 5:
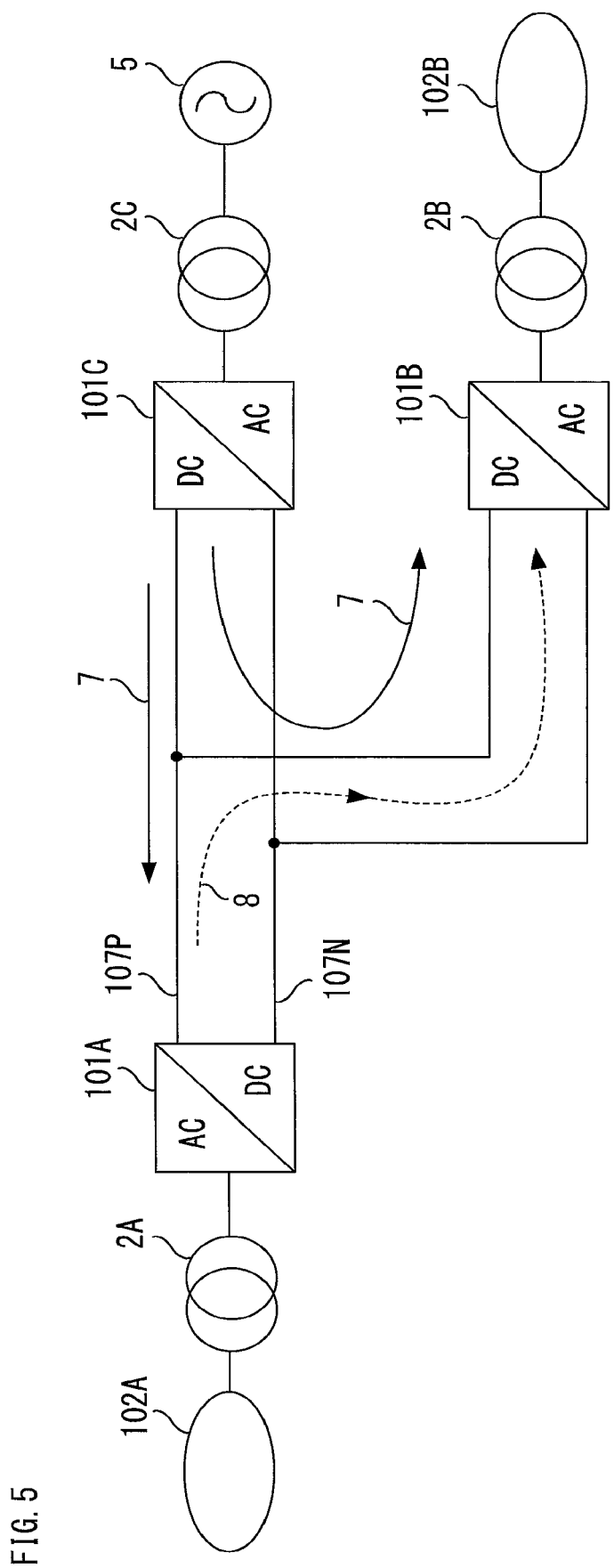
FIG. 5 is a configuration diagram showing the entirety of a power conversion system according to embodiment 2 of the present invention.
Figure 6:
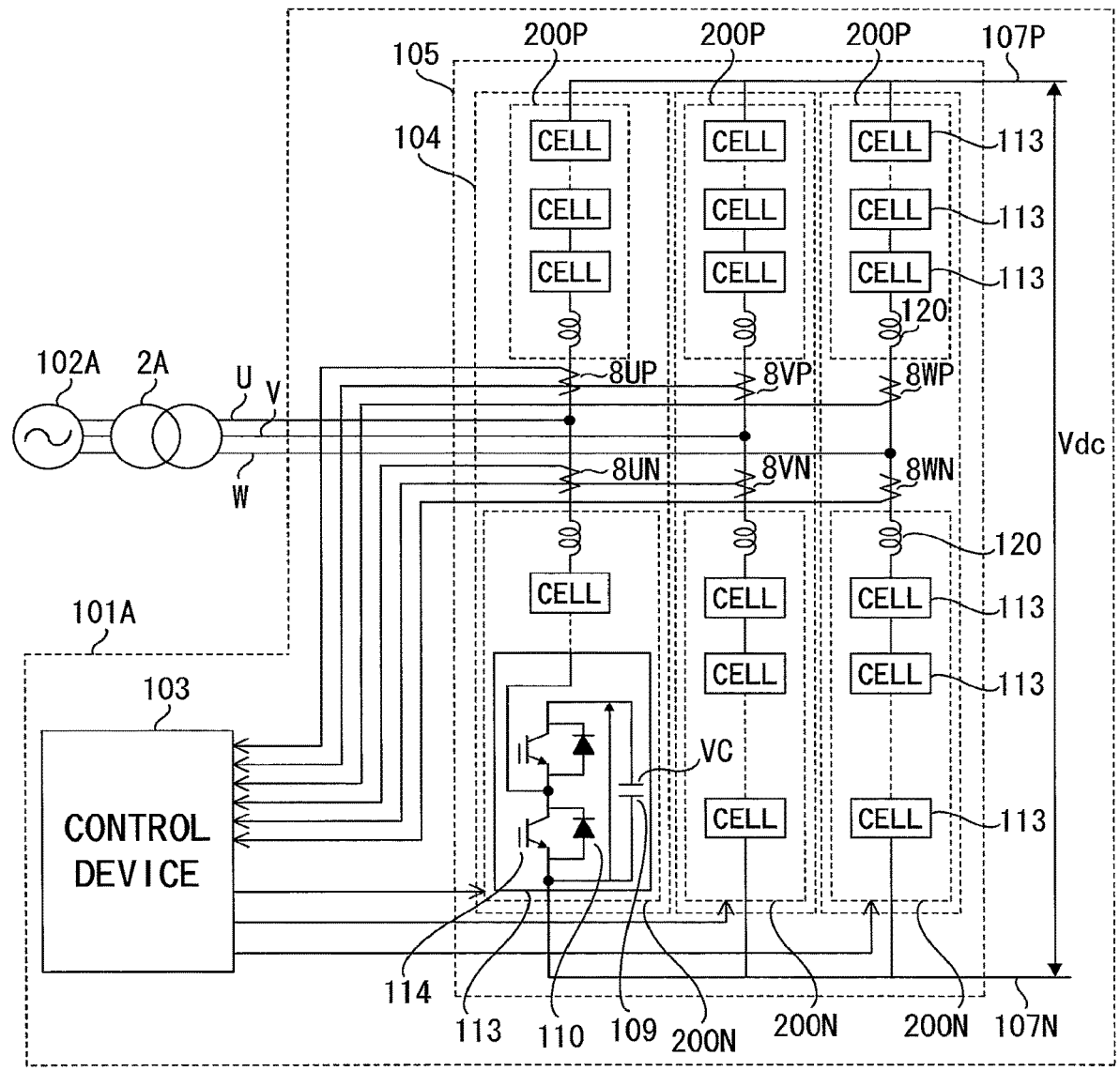
FIG. 6 is a configuration diagram of a self-excitation-type DC/AC power conversion device composing the power conversion system according to embodiment 2 of the present invention.

FIG. 5 is a configuration diagram showing the entirety of a power conversion system according to embodiment 2 of the present invention, and FIG. 6 is a configuration diagram of a self-excitation-type power conversion device composing the power conversion system according to embodiment 2 of the present invention.

In the power conversion system according to embodiment 2 of the present invention, the case where three self-excitation-type first, second, and third DC/AC power conversion devices 101A, 101B, 101C for performing power conversion from AC power to DC power are interconnected with each other by direct current, will be described.

In the third DC/AC power conversion device 101C, terminals on one side are interconnected with the AC power supply system 5 via a transformer 2C, and terminals on the other side are connected to DC buses 107P, 107N so as to be interconnected with a high-voltage DC power transmission network. It is noted that the AC power supply system 5 and the third DC/AC power conversion device 101C in the present embodiment respectively correspond to a main power supply system and a main power conversion device in claims.

In the first DC/AC power conversion device 101A and the second DC/AC power conversion device 101B, terminals on one side are connected to the DC buses 107P, 107N, and terminals on the other side are respectively interconnected with first and second AC systems 102A, 102B via transformers 2A, 2B. In this case, the first AC system 102A is an AC system including an AC power supply, and the second AC system 102B is an AC system mainly including a load.

In normal power transmission, voltage of power supplied from the AC power supply system 5 is transformed via the transformer 2C, the resultant AC power is converted to DC power by the third DC/AC power conversion device 101C, and then the DC power is transmitted in a power flow direction 7 indicated by a solid line in the drawing. The power transmitted from the third DC/AC power conversion device 101C passes through the DC buses 107P, 107N and then is converted from DC power to AC power by each of the first and second DC/AC power conversion devices 101A, 101B. Voltage of the converted AC power is transformed by the transformers 2A, 2B, and then the resultant power is supplied to the first and second AC systems 102A, 102B.

Next, the first and second DC/AC power conversion devices 101A, 101B which are self-excitation type will be described with reference to FIG. 6.

The first and second DC/AC power conversion devices 101A, 101B both have the same configuration and include a modular multilevel converter (hereinafter, referred to as MMC power converter) 105 and a control device 103 for controlling the MMC power converter 105. The MMC power converter 105 includes leg circuits 104 having a positive arm 200P and a negative arm 200N with their one-side terminals connected in series to each other, the positive arm 200P and the negative arm 200N being composed of a plurality of converter cells 113 and one arm reactor 120 connected in series. The number of the leg circuits 104 is equal to the number of phases of the AC system (in FIG. 6, the number corresponding to three phases), and these leg circuits 104 are connected in parallel between the positive and negative DC buses 107P, 107N. The positive arm 200P and the negative arm 200N of leg circuits 104 are provided with current detectors (8UP, 8VP, 8WP) and (8UN, 8VN, 8WN) for detecting their respective current values.

The connection points (AC-side terminals of the power converter 105) between the positive arms 200P and the negative arms 200N are connected to AC lines (U, V, W) for respective phases. The one-side terminals of the positive arms 200P are connected to the DC bus 107P on the positive side and the other-side terminals of the negative arms 200N are connected to the DC bus 107N on the negative side.

Each converter cell 113 of the MMC power converter 105 has a bidirectional chopper circuit in which two pairs of a semiconductor switching element 114 and a diode 110 connected in parallel to the semiconductor switching element 114 are connected in series, and a DC capacitor 109 is connected in parallel to the bidirectional chopper circuit. Here, IGBTs are used as the semiconductor switching element 114. However, without limitation thereto, other self-extinguishing type semiconductor switching elements may be used.

DC voltage Vdc is voltage between the DC buses 107P and 107N, and is equal to a value obtained by synthesizing voltages VC of the DC capacitors 109 of the plurality of converter cells 113 provided in each leg circuit 104.

Here, the first and second DC/AC power conversion devices 101A, 101B are configured by using the MMC power converters 105. However, without limitation thereto, other voltage-type DC/AC power converters may be used.

Figure 7:
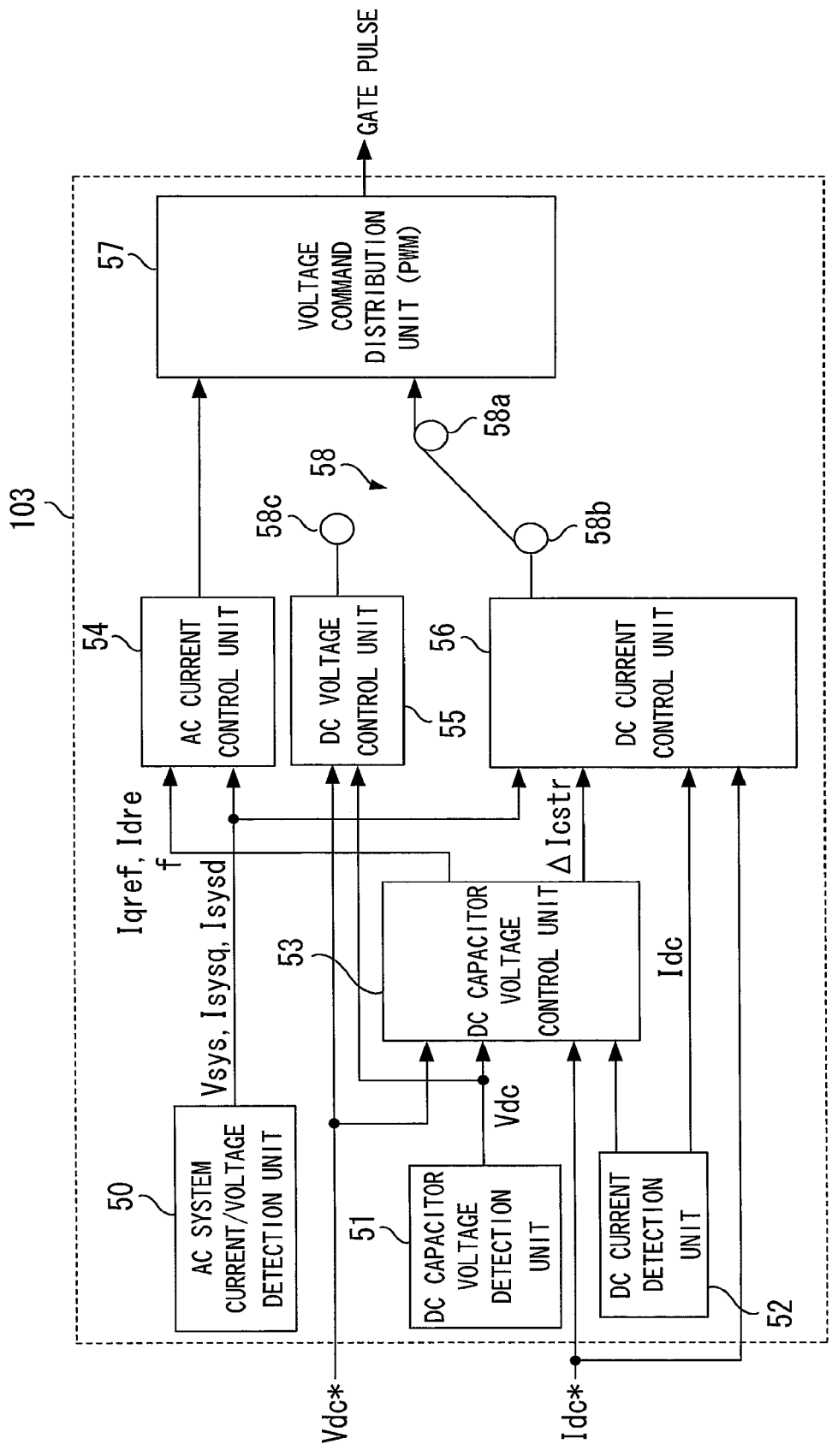
FIG. 7 is a block diagram showing a function of a control device of the power conversion device according to embodiment 2 of the present invention.

FIG. 7 is a block diagram showing the function of the control device 103 in the first DC/AC power conversion device 101A.

During normal operation, the control device 103 of the first DC/AC power conversion device 101A detects voltage Vsys, active current Isysq, and reactive current Isysd of the first AC system 102A by an AC system current/voltage detection unit 50. On the basis of the voltage Vsys, the active current Isysq, and the reactive current Isysd of the first AC system 102A detected by the AC system current/voltage detection unit 50, and an active current command value Iqref and a reactive current command value Idref outputted from a DC capacitor voltage detection unit 51, an AC current control unit 54 performs feedback control about the active current Isysq and the reactive current Isysd. As used herein, an electricity amount is represented by a ratio with respect to a reference value, and command values for voltage, current, and the like and detection values thereof are expressed by per unit method.

A DC voltage control unit 55 functions when the third DC/AC power conversion device 101C has stopped power transmission and the first DC/AC power conversion device 101A serves as a power-transmitting end. During power transmission in the power flow direction 7 indicated by the solid line in FIG. 5, DC voltage is controlled by the third DC/AC power conversion device 101C, and therefore the DC voltage control unit 55 does not function during the normal power transmission. A common contact 58a of a changeover switch 58 is connected to an individual contact 58b on the DC current control unit 56 side.

A DC capacitor voltage detection unit 51 detects an average value obtained by synthesizing voltages VC of the DC capacitors 109 of the converter cells 113, as DC voltage Vdc between the DC buses 107P and 107N. Therefore, here, the average value obtained by synthesizing voltages VC of the DC capacitors 109 and detected by the DC capacitor voltage detection unit 51 is denoted by Vdc.

A DC capacitor voltage control unit 53 receives the DC voltage Vdc detected by the DC capacitor voltage detection unit 51 and a DC voltage command value Vdc*, and outputs error current ΔIcstr calculated by performing feedback control according to a difference between the DC voltage Vdc and the DC voltage command value Vdc*.

The error current ΔIcstr is a current amount needed in order to charge or discharge the DC capacitor 109, when the DC voltage Vdc varies. The error current ΔIcstr is equal to a difference between DC current Idc and active current Isysq of AC current inputted to the first DC/AC power conversion device 101A.

The DC capacitor voltage control unit 53 performs feedforward control according to a sum of the error current ΔIcstr and the DC current command value Idc*, whereby an active current command value Iqref is obtained. And the DC capacitor voltage control unit 53 outputs the active current command value Iqref to the AC current control unit 54. In this way, feedforward control according to the DC current command value Idc* is performed by using the error current ΔIcstr, whereby disturbance responsiveness with respect to the DC capacitor voltage Vdc is enhanced.

A DC current detection unit 52 detects DC current Idc. The DC current control unit 56 receives the DC current Idc detected by the DC current detection unit 52, the error current ΔIcstr calculated by the DC capacitor voltage control unit 53, and the voltage Vsys, the active current Isysq, and the reactive current Isysd of the first AC system 102A detected by the AC system current/voltage detection unit 50.

The DC current control unit 56 subtracts the error current ΔIcstr from the active current Isysq, thereby a new DC current command value Idc* is calculated. And the DC current control unit 56 performs feedback control according to a difference ΔIdc between the new DC current command value Idc* and the DC current Idc, thereby the DC current control unit 56 performs control so that the DC current Idc to be transmitted follows the DC current command value Idc*. The DC current command value Idc* is outputted to a voltage command distribution unit 57. The voltage command distribution unit 57 performs voltage command distribution (PWM) of the DC current command value Idc*, thereby gate signals for driving the semiconductor switching elements 114 are generated.

Here, if the third DC/AC power conversion device 101C having served for power transmission is abruptly stopped, power is no longer supplied from the third DC/AC power conversion device 101C to the first and second DC/AC power conversion devices 101A, 101B, so that voltage VC of the DC capacitor 109 of each converter cell 113 is reduced. Further, since the third DC/AC power conversion device 101C controlling the DC voltage Vdc is stopped, during a period until a high-rank system control device detects the stop of the third DC/AC power conversion device 101C and newly outputs a DC voltage control command to another power conversion device, the DC voltage Vdc is not temporarily controlled, so that the DC voltage Vdc easily varies.

That is, when the stop of the third DC/AC power conversion device 101C is detected, a high-rank control system (not shown) of the system eventually outputs a control switching command to another normal power conversion device (here, the first DC/AC power conversion device 101A). Then, the first DC/AC power conversion device 101A is switched to serve for DC voltage control. However, some time period is required until the switching, and therefore, during this period, the DC voltage Vdc is reduced, and further, operation might be stopped.

In order to avoid such a situation and continue operation, it is necessary that, during a period until the high-rank control system outputs a control switching command to the first DC/AC power conversion device 101A and the first DC/AC power conversion device 101A is switched to serve for DC voltage control, the DC voltage Vdc is kept to be constant and the power flow direction is changed to the power flow direction 8 from the first AC system 102A toward second AC system 102B as indicated by a broken line in FIG. 5, and it is necessary to continue the power transmission to the second AC system 102B.

Figure 8:
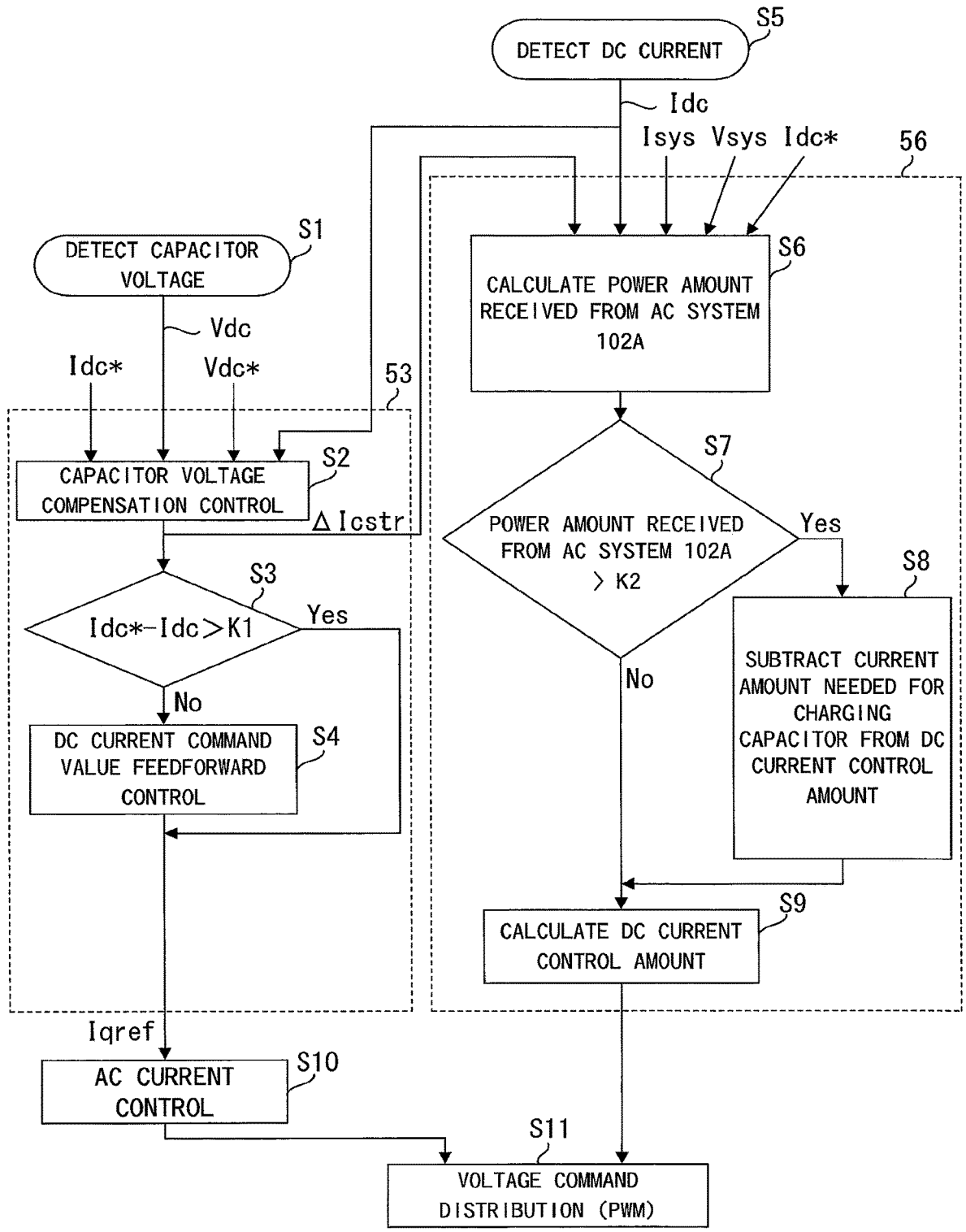
FIG. 8 is a control flowchart showing control operation of the control device of the power conversion device according to embodiment 2 of the present invention.

Here, with reference to a control flowchart shown in FIG. 8, description will be given about control operations of the AC current control unit 54, the DC capacitor voltage control unit 53, and the DC current control unit 56 composing the control device 103 of the first DC/AC power conversion device 101A during a period (hereinafter, referred to as transient period) until power flow is changed to the power flow direction 8 indicated by the broken line in FIG. 5 and the DC voltage control unit 55 of the first DC/AC power conversion device 101A is switched so as to control the DC voltage Vdc, when the third DC/AC power conversion device 101C having served for power transmission has stopped the power transmission. In FIG. 8, reference character S denotes a processing step.

First, the DC capacitor voltage detection unit 51 detects an average value obtained by synthesizing voltages VC of the DC capacitors 109 of the converter cells 113, as DC voltage Vdc between the DC buses 107P and 107N (step S1).

Next, the DC capacitor voltage control unit 53 performs capacitor voltage compensation control (step S2). In the capacitor voltage compensation control, feedback control is performed according to a difference between the DC voltage command value Vdc* and the DC voltage Vdc detected by the DC capacitor voltage detection unit 51, thereby control is performed so that the DC voltage Vdc follows the DC voltage command value Vdc*. At this time, error current ΔIcstr needed in order to charge the DC capacitor 109 so as to compensate for voltage reduction of the DC capacitor 109 is calculated and outputted to the DC current control unit 56 (step S2).

Next, the DC capacitor voltage control unit 53 compares the DC current command value Idc* with the DC current Idc, and determines whether or not a difference therebetween is greater than a predetermined value K1 (a value can be considered that power flow has sharply changed, e.g., 50% to 70%) (step S3).

If the difference between the DC current command value Idc* and the DC current Idc is equal to or smaller than K1, feedforward control according to the DC current command value Idc* is performed by using the error current ΔIcstr, thereby the active current command value Iqref and the reactive current command value Idref is generated (step S4).

On the other hand, while the third DC/AC power conversion device 101C is stopped, if the difference between the DC current command value Idc* and the DC current Idc has become greater than the predetermined value K1, the process shown in step S4 is not performed, the feedforward control according to the DC current command value Idc* by using the error current ΔIcstr is stopped, and the active current command value Iqref is set within a range which does not exceed, approximately, +10% from the rated current.

The reason is as follows. In a state immediately after the third DC/AC power conversion device 101C is stopped, DC current does not flow and therefore a difference between the DC current command value Idc* (for example, −1 pu) and the DC current Idc (for example, 0 pu) increases so that these values deviate from each other by approximately 70% or more. In the deviated state, if feedforward control according to the DC current command value Idc* is performed by using the error current ΔIcstr, an active current control limiter is exerted, instability of the DC capacitor voltage Vdc is caused. Therefore, as a result of the determination in step S3, if the difference between the DC current command value Idc* and the DC current Idc is greater than the predetermined value K1, the active current command value Iqref is calculated without performing feedforward control according to the DC current command value Idc* by using the error current ΔIcstr as shown in step S4.

Thus, it is possible to output the active current command value Iqref so as to gradually change the DC current direction from the power flow direction 7 indicated by the solid line in FIG. 5 to the power flow direction 8 indicated by the broken line, while keeping the DC voltage Vdc to be stable in the first DC/AC power conversion device 101A.

Next, description will be given about control operation of the DC current control unit 56 for controlling the DC current Idc so as to keep the DC voltage Vdc to be constant after power flow is changed from the power flow direction 7 indicated by the solid line in FIG. 5 to the power flow direction 8 indicated by the broken line when the third DC/AC power conversion device 101C has stopped power transmission.

The DC current detection unit 52 detects DC current Idc flowing between the DC buses 107P and 107N (step S5).

The DC current control unit 56 receives the DC current Idc detected by the DC current detection unit 52, the AC voltage Vsys and the AC current (Isysq, Isysd) of the first AC system 102A detected by the AC system current/voltage detection unit 50, and the error current ΔIcstr calculated by the DC capacitor voltage control unit 53. Then, on the basis of the above inputted input information, the DC current control unit 56 calculates a power amount received by the first DC/AC power conversion device 101A from the first AC system 102A (step S6).

Next, the DC current control unit 56 determines whether or not the power amount received from the first AC system 102A is greater than the predetermined value K2 (corresponding to the case where the power amount supplied from the first AC system 102A to the load is sufficiently large, i.e., approximately 90% of the power amount required for the load) (step S7).

If the power amount received from the first AC system 102A is greater than the predetermined value K2, the error current ΔIcstr which is a current amount needed in order to charge the DC capacitor 109 is subtracted from the DC current command value Idc* (step S8).

Then, the value obtained by subtracting the error current ΔIcstr from the DC current command value Idc* in step S8 is calculated as a new DC current command value Idc* (step S9).

Then, feedback control is performed according to a difference between the new DC current command value Idc* and the DC current Idc, thereby control is performed so that the DC current Idc to be transmitted follows the DC current command value Idc*, and the DC current command value Idc* is outputted to the voltage command distribution unit 57.

In this case, if the error current ΔIcstr is sharply subtracted, the DC current might vary sharply. Therefore, the subtraction is gradually performed so that the value of the error current ΔIcstr is gently varied from 0% to 100% over a certain time period.

As described above, when the third DC/AC power conversion device 101C is stopped, power is gradually supplied from the first AC system 102A by change of power flow. Therefore, at a stage in which the amount of power flowing from the first AC system 102A is small, if the error current ΔIcstr which is a current amount for compensating voltage VC of the DC capacitor 109 is subtracted from the DC current command value Idc*, the DC current Idc and the error current ΔIcstr are balanced, i.e., the DC current Idc is stabilized at zero, so that the DC current might not flow in the power flow direction 8 indicated by the broken line in FIG. 5.

In view of the above, in order to continue power transmission while power flow is inverted, only when the power amount received from the first AC system 102A has become large enough to be supplied to the load (YES in step S7), the error current ΔIcstr is subtracted from the DC current command value Idc* while the value of the error current ΔIcstr is gently varied from 0% to 100% in the process of step S8. Thus, it is possible to continue power transmission stably.

Then, the voltage command distribution unit 57 performs voltage command distribution (PWM) of the DC current command value Idc* obtained in the above step S9, thereby gate signals for driving the semiconductor switching elements 114 is generated (step S11).

According to the above control flow, regarding voltage reduction in the case of not being accompanied by power flow change, when the DC voltage Vdc is temporarily reduced, the DC capacitor voltage control unit 53 performs feedforward control according to the sum of the DC current command value Idc* and the current amount (error current) ΔIcstr needed in order to charge the DC capacitor 109, whereby it is possible to suppress variation in voltage of the DC capacitor 109 in the case of temporary voltage reduction.

In the case where current is sharply changed while power flow is changed, a difference between the DC current command value Idc* and the DC current Idc becomes greater than the predetermined value K1, and therefore the active current command value Iqref is calculated without performing feedforward control according to the DC current command value Idc* by using the error current ΔIcstr, thereby the reduction of the DC voltage Vdc is compensated. Thus, an appropriate current amount is synthesized as the active current command value Iqref, variation in the DC voltage Vdc is suppressed, and power transmission can be continued stably.

In addition, in the case of being accompanied by power flow change, the DC current control unit 56 performs control such that, if the amount of power flowing from the first AC system 102A to the first DC/AC power conversion device 101A is small, the error current ΔIcstr is not subtracted from the DC current command value Idc*. Thus, a situation in which a balance is made with the DC current command value Idc* keeping to be zero is avoided, power flow can be changed stably, and operation can be continued.

Eventually, the control device in the high-rank system outputs a command for switching to DC voltage control, to the control device 103 of the first DC/AC power conversion device 101A, and accordingly, the common contact 58a of the changeover switch 58 is switched so as to be connected to the individual contact 58c connected to the DC voltage control unit 55, whereby the DC voltage control unit 55 controls the DC voltage Vdc so as to keep the DC voltage Vdc to be constant.

As described above, according to the present embodiment 2, in the power conversion system in which the self-excitation-type first, second and third DC/AC power conversion devices for performing bidirectional power conversion are interconnected with each other by direct current, when the third DC/AC power conversion device 101C serving for power transmission and performing DC voltage control is abruptly stopped, another normal first DC/AC power conversion device 101A controls the DC voltage Vdc so as to be constant, and by power flow change, it is possible to continue power transmission from the first AC system 102A having a sufficient power capacity to the second AC system 102B which is the load.

Embodiment 3

Hereinafter, a power conversion system according to embodiment 3 of the present invention will be described with reference to FIG. 9, FIG. 10, FIG. 11, and FIG. 12.

Figure 9:
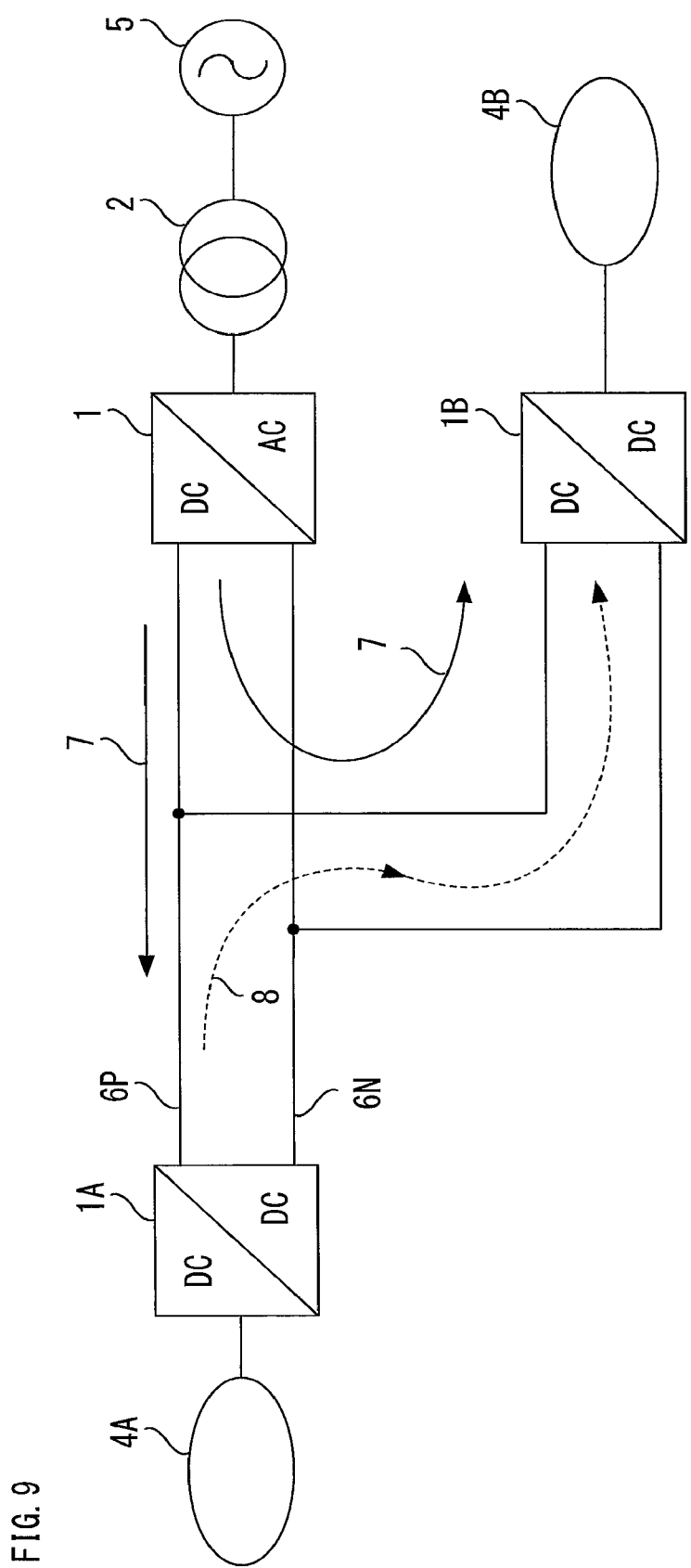
FIG. 9 is a configuration diagram showing the entirety of a power conversion system according to embodiment 3 of the present invention.
Figure 10:
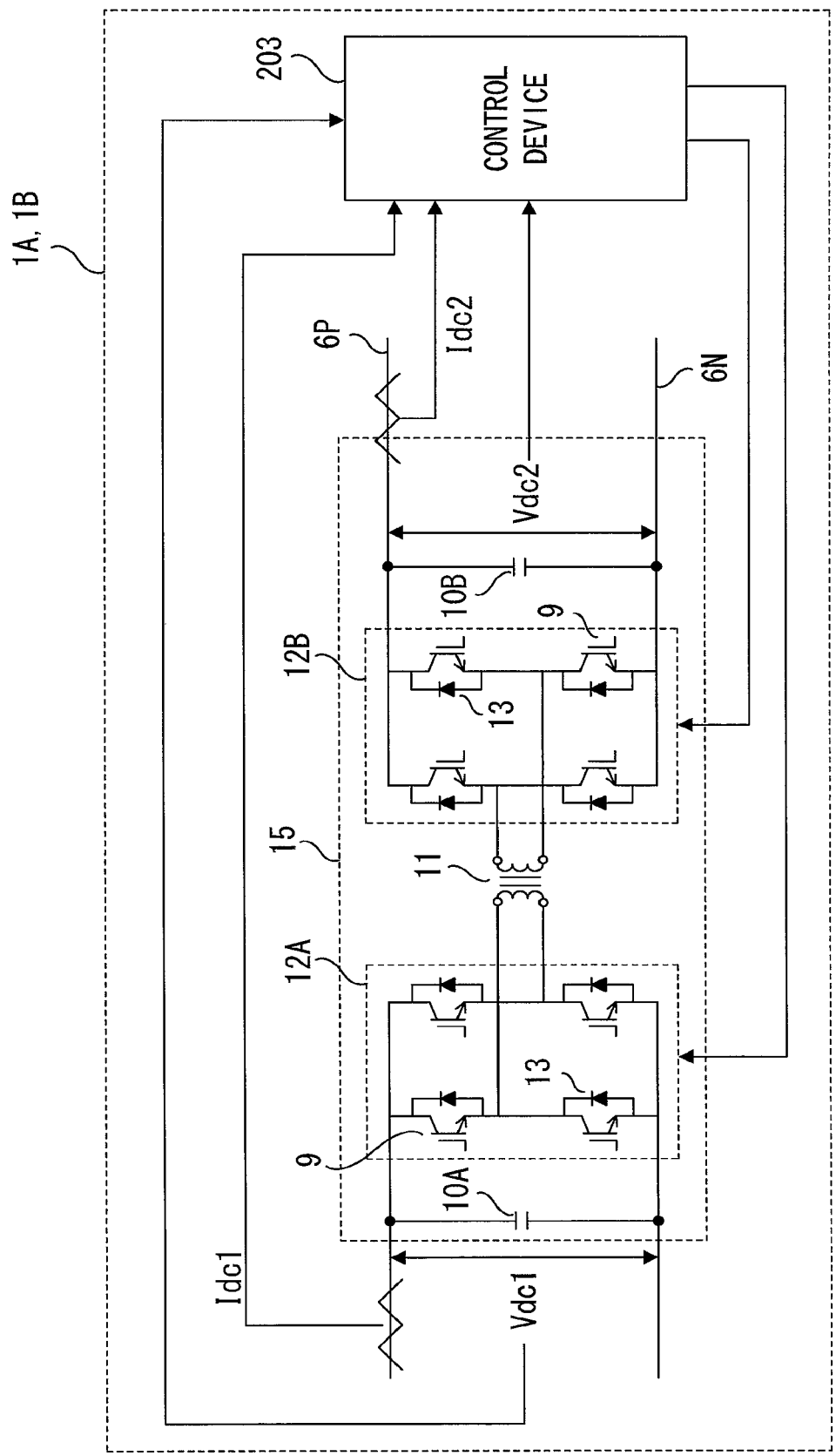
FIG. 10 is a configuration diagram of a self-excitation-type DC/DC power conversion device composing the power conversion system according to embodiment 3 of the present invention.

FIG. 9 is a configuration diagram showing an entirety of the power conversion system according to embodiment 3, which has the same configuration as that of the power conversion system in FIG. 1 described in embodiment 1. FIG. 10 is a configuration diagram of a self-excitation-type DC/DC power conversion device composing the power conversion system according to embodiment 3, which has almost the same configuration as that of the self-excitation-type DC/DC power conversion device in FIG. 2 described in embodiment 1, but the configuration and operation of the control device are different from those in embodiment 1. In FIG. 9 and FIG. 10, the same components as those in FIG. 1 and FIG. 2 are denoted by the same reference characters, and the description thereof is omitted appropriately.

In embodiment 1, during normal power transmission, the DC/AC power conversion device 1 controls the high-voltage-side DC voltage Vdc2 to be constant, and the control device 3 of each of the first DC/DC power conversion device 1A and the second DC/DC power conversion device 1B controls the low-voltage-side DC voltage Vdc1 to be constant. When the DC/AC power conversion device 1 is stopped, charge/discharge current of the DC capacitor 10B is compensated by the high-voltage-side DC current control of the first DC/DC power conversion device 1A, whereby power transmission is continued.

In a multi-terminal DC system, it is also conceivable that a plurality of power conversion devices control DC voltage of the power transmission system, thereby DC power transmission current is adjusted. Therefore, in embodiment 3 of the present invention, the case of performing high-voltage-side DC voltage control for the high-voltage-side DC voltage Vdc2 by both of the DC/AC power conversion device 1 and the first DC/DC power conversion device 1A will be described.

When the first DC/DC power conversion device 1A performs high-voltage-side DC voltage control, it is necessary that the first DC/DC power conversion device 1A controls high-voltage-side DC capacitor voltage so as to cover a power amount needed for the load system interconnected with the second DC/DC power conversion device 1B.

Figure 11:
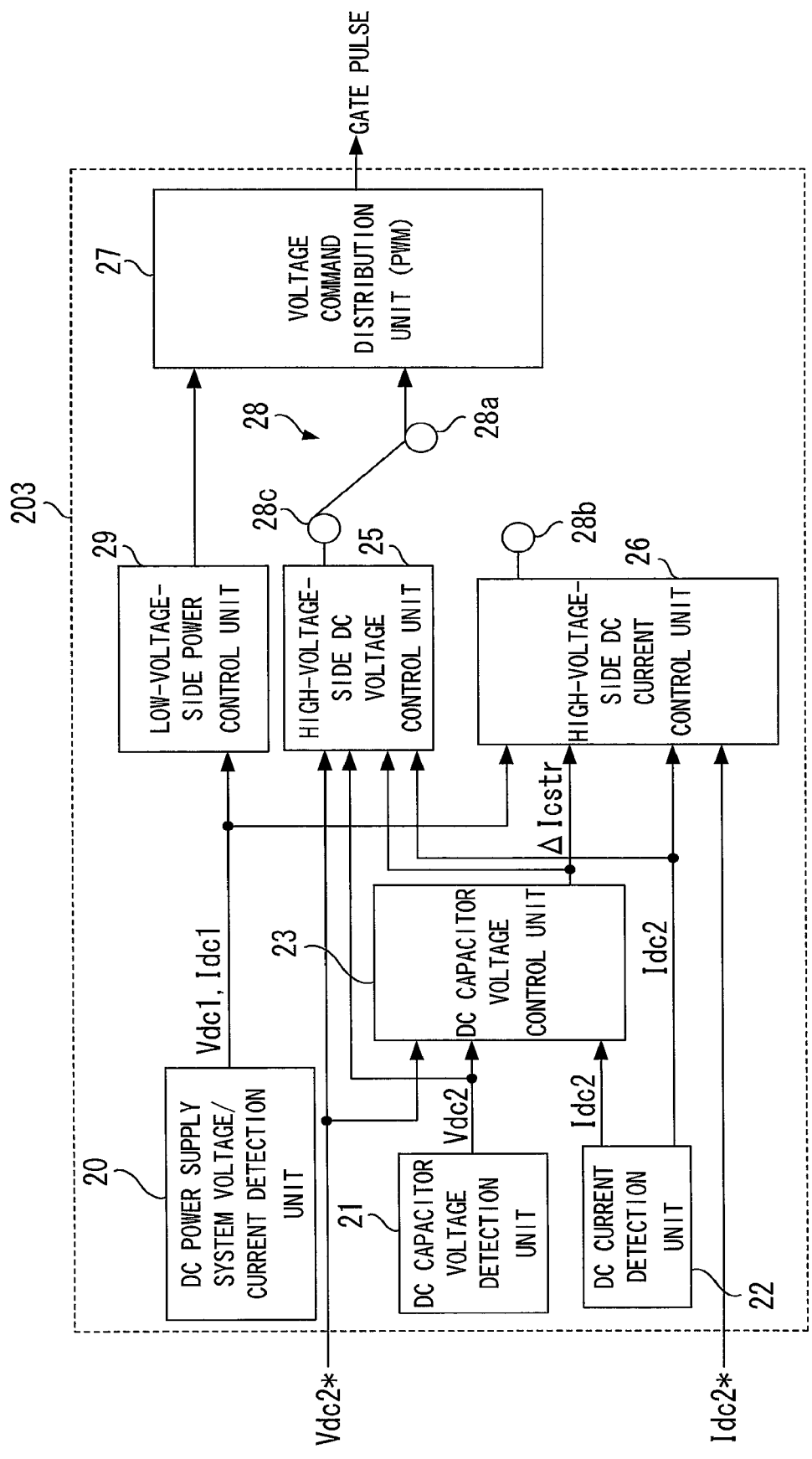
FIG. 11 is a block diagram showing a function of a control device of the power conversion device according to embodiment 3 of the present invention.

FIG. 11 is a block diagram showing the function of the control device of the power conversion device according to embodiment 3, and showing the function of a control device 203 when the first DC/DC power conversion device 1A performs high-voltage-side DC voltage control.

In FIG. 11, in the control device 203, the DC capacitor voltage detection unit 21 detects high-voltage-side DC capacitor voltage which is voltage of the high-voltage-side DC capacitor 10B, as high-voltage-side DC voltage Vdc2. Therefore, here, the high-voltage-side DC capacitor voltage detected by the DC capacitor voltage detection unit 21 is denoted by the same Vdc2.

The DC capacitor voltage control unit 23 performs feedback control according to a difference between a high-voltage-side DC voltage command value Vdc2* and the high-voltage-side DC capacitor voltage Vdc2, thereby error current ΔIcstr is calculated, and the error current ΔIcstr is outputted.

The error current ΔIcstr occurs when the high-voltage-side DC voltage Vdc2 varies. In a steady state, input current and output current of the high-voltage-side DC capacitor 10B are equal to each other and therefore the error current ΔIcstr is equal to 0. However, if an input/output power balance is lost at the time of fault, the high-voltage-side DC capacitor 10B is charged or discharged and thus a difference between input current and output current is detected as the error current ΔIcstr.

Also, the DC capacitor voltage control unit 23 outputs the above error current ΔIcstr to the high-voltage-side DC voltage control unit 25.

As for the low-voltage-side DC voltage Vdc1, the DC voltage is controlled to be constant by a device in the DC system 4A, and the control device 203 of the first DC/DC power conversion device 1A controls high-voltage-side DC voltage to be constant by the high-voltage-side DC voltage control unit 25, and adjusts the amount of input/output power of the power conversion device 1A by the low-voltage-side power control unit 29.

The common contact 28a of the changeover switch 28 is connected to the individual contact 28c of the high-voltage-side DC voltage control unit 25 side. That is, when the high-voltage-side DC voltage control unit 25 is functioning, the high-voltage-side DC current control unit 26 does not function.

In the power conversion system shown in FIG. 9, if the DC/AC power conversion device 1 serving for power transmission is stopped, power is no longer supplied from the DC/AC power conversion device 1, and the high-voltage-side DC voltage Vdc2 of the DC capacitor 10B on the high-voltage side for which voltage control is performed by the first DC/DC power conversion device 1A is reduced.

Figure 12:
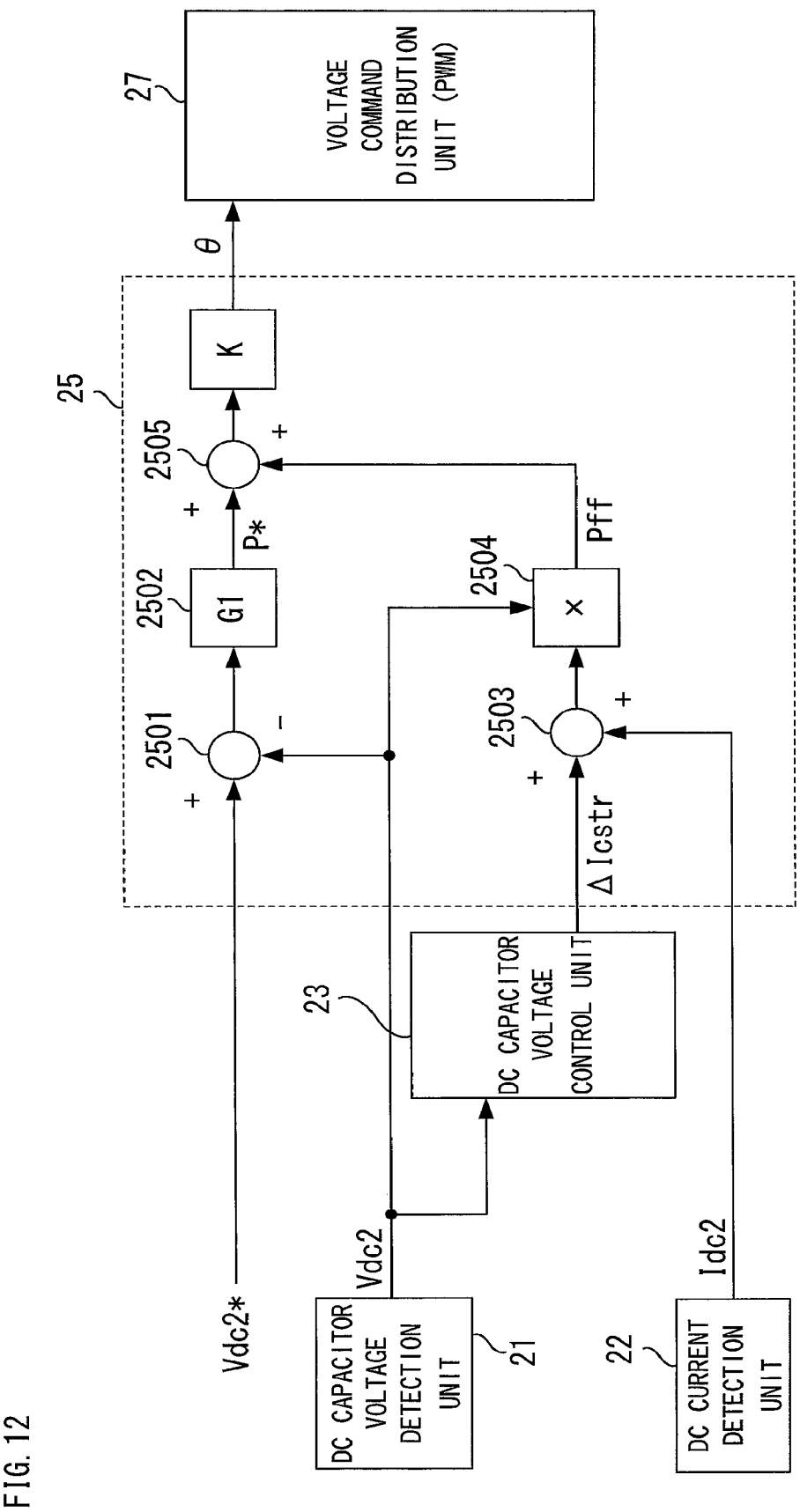
FIG. 12 is a block diagram showing a function of a high-voltage-side DC voltage control unit according to embodiment 3 of the present invention.

Here, control of the high-voltage-side DC voltage control unit 25 of the first DC/DC power conversion device 1A will be described with reference to FIG. 12.

The high-voltage-side DC voltage control unit 25 of the first DC/DC power conversion device 1A receives the high-voltage-side DC voltage command value Vdc2*, the high-voltage-side DC voltage Vdc2 outputted from the DC capacitor voltage detection unit 21, the error current ΔIcstr needed for charging or discharging the DC capacitor 10B, and the high-voltage-side DC current value Idc2 outputted from the DC current detection unit 22.

In the high-voltage-side DC voltage control unit 25, a subtractor 2501 calculates a difference value between the high-voltage-side voltage command value Vdc2* and the high-voltage-side DC voltage value Vdc2, and a gain 2502 multiplies, by G1, the difference value outputted from the subtractor 2501, thereby a power amount P* corresponding to the voltage difference is calculated.

Meanwhile, an adder 2503 adds the high-voltage-side DC current value Idc2 which is the output current amount of the first DC/DC power conversion device 1A, and the error current ΔIcstr outputted from the DC capacitor voltage control unit 23. Next, a multiplier 2504 multiplies the resultant addition value from the adder 2503 by the high-voltage-side DC voltage Vdc2, thereby a power amount Pff is calculated. Then, an adder 2505 adds the power amount Pff and the power amount P* corresponding to the voltage difference, and the resultant value is multiplied by a constant K, whereby a phase difference θ is obtained, and the phase difference θ is outputted to a voltage command distribution unit (PWM) 27.

In the voltage command distribution unit (PWM) 27, the duty ratio of PWM control gate drive of the first DC/DC power conversion device 1A is fixed at 50%, and the phase of the gate signals for the low-voltage side is used as a reference, the phase of the gate signals for the high-voltage side is shifted by the phase θ, whereby high-voltage-side gate signals are generated.

When high-voltage-side DC voltage control is performed by both of the first DC/DC power conversion device 1A and the DC/AC power conversion device 1, it is conceivable that both DC voltage controls interfere with each other and thus control responsiveness is deteriorated. However, in the present embodiment, in DC voltage control, a value obtained by adding the high-voltage-side DC current value Idc2 which is the output current amount of the first DC/DC power conversion device 1A and the error current ΔIcstr outputted from the DC capacitor voltage control unit 23 is multiplied by the high-voltage-side DC voltage Vdc2, and feedforward control is performed by the power amount, whereby disturbance responsiveness with respect to the high-voltage-side DC voltage Vdc2 is enhanced and a power amount needed for charging the high-voltage-side DC capacitor is compensated. Thus, it is possible to swiftly suppress reduction in the high-voltage-side DC capacitor voltage Vdc2.

As described above, according to the present embodiment 3, in the power conversion system in which the self-excitation-type power conversion devices 1, 1A, 1B for performing bidirectional power conversion are interconnected with each other by direct current, when the DC/AC power conversion device 1 and the first DC/DC power conversion device 1A control DC system voltage in common, if the DC/AC power conversion device 1 serving for power transmission and performing DC voltage control is stopped, variation in the high-voltage-side DC voltage Vdc2 is swiftly suppressed due to DC voltage control by the first DC/DC power conversion device 1A so that the DC system voltage is controlled to be constant. Thus, it is possible to stably continue power transmission from the first DC system 4A as a DC power supply to the second DC system 4B as a load.

It is noted that the present invention is not limited to only the configurations of the above embodiments 1 to 3. Without departing from the scope of the present invention, the configurations of the above embodiments 1 to 3 may be partially modified or some parts thereof may be omitted, and further, the configurations of the above embodiments 1 to 3 may be combined with each other appropriately.

The invention claimed is:

1. A power conversion system comprising at least three self-excitation-type power conversion devices each having self-extinguishing type semiconductor switching elements and performing, in a bidirectional manner, one of conversion between AC power and DC power and conversion between DC power and DC power, the at least three self-excitation-type power conversion devices being interconnected with each other via DC buses by direct current in order to perform power transmission, the power conversion system being configured so that, when a main power conversion device that is connected to a main power supply system and serves for power supply and voltage control has stopped operation, a first power conversion device connected to other power supply system other than the main power supply system among the remaining power conversion devices supplies power to a load system, in place of the main power conversion device that has stopped operation, wherein the first power conversion device connected to the other power supply system includes: a power converter in which one of a voltage value of a capacitor connected between the DC buses and a synthesis value of voltage of a plurality of DC capacitors connected between the DC buses is kept at constant DC voltage; and a control device for controlling operation of the power converter, and the control device includes:
a DC current detection unit for detecting DC current flowing through the DC buses;
a DC capacitor voltage detection unit for detecting voltage of the DC capacitor;
a DC capacitor voltage control unit which performs control so that the DC capacitor voltage detected by the DC capacitor voltage detection unit follows a DC voltage command value, and calculates a DC current control amount for controlling the DC capacitor voltage;
a DC current control unit for performing control so that the DC current detected by the DC current detection unit follows a DC current command value, on the basis of the DC current control amount calculated by the DC capacitor voltage control unit;
a DC voltage control unit for performing control so that voltage of the DC buses follows the DC voltage command value; and
a voltage command distribution unit for driving the self-extinguishing type semiconductor switching elements on the basis of the DC voltage command value and the DC current command value, and when variation in the DC capacitor voltage and stop of operation of the main power conversion device serving for power supply and voltage control are detected, by the DC capacitor voltage control unit and one of the DC current control unit and the DC voltage control unit, charge/discharge current of the DC capacitor voltage is compensated and a DC power transmission current amount is adjusted in accordance with an electricity amount supplied from the other power supply system.

2. The power conversion system according to claim 1, wherein the DC capacitor voltage control unit
detects variation in the DC capacitor voltage from rated voltage,
calculates a current amount for performing charge/discharge by an amount corresponding to the detected variation,
compares a difference between the DC current command value and the DC current detected by the DC current detection unit with a reference value for determining power flow sharp change,
adds, to the DC current command value, a current amount for performing charge by an amount corresponding to reduction in the DC capacitor voltage, in accordance with a result of the comparison, and
uses the resultant value of the addition as a current command value for controlling an amount of current flowing from the other power supply system.

3. The power conversion system according to claim 2, wherein when detecting that an electricity amount received from the other power supply system has become a value that can ensure a sufficient current amount for charging the DC capacitor and being supplied to the load system, the DC current control unit subtracts a current amount for performing charge/discharge by an amount corresponding to variation in the DC capacitor voltage, from the DC current command value, and uses the resultant value of the subtraction as a new DC current command value.

4. The power conversion system according to claim 3, wherein a power amount or a current amount is used as the electricity amount which is received from the other power supply system and which is used in the DC current control by the DC current control unit.

5. The power conversion system according to claim 3, wherein when the current amount for performing charge/discharge by an amount corresponding to variation in the DC capacitor voltage is subtracted from the DC current command value, the DC current control unit gently performs the subtraction over a certain time period, thereby calculating the new DC current command value.

6. The power conversion system according to claim 1, wherein when variation in the DC capacitor voltage is detected while the voltage of the DC buses is controlled by the DC voltage control unit,
the DC voltage control unit outputs a control amount obtained by adding,
to a power amount obtained by calculating a difference between the DC voltage command value and a DC voltage detection value, a power amount obtained by multiplying the DC capacitor voltage by a value obtained by adding an output current amount of the first power conversion device and the DC current control amount calculated by the DC capacitor voltage control unit, and the voltage command distribution unit drives the self-extinguishing type semiconductor switching elements.

7. The power conversion system according to claim 1, wherein during a transient period until the DC voltage control unit performs control so that the voltage of the DC buses follows the DC voltage command value in accordance with a high-rank command outputted from a high-rank control system in response to stop of operation of the main power conversion device connected to the main power supply system and serving for power supply and voltage control, the DC voltage and power flow are stabilized by the capacitor voltage control by the DC capacitor voltage control unit and one of the DC voltage control by the DC voltage control unit and the DC current control by the DC current control unit.

8. The power conversion system according to claim 4, wherein when the current amount for performing charge/discharge by an amount corresponding to variation in the DC capacitor voltage is subtracted from the DC current command value, the DC current control unit gently performs the subtraction over a certain time period, thereby calculating the new DC current command value.

9. The power conversion system according to claim 2, wherein during a transient period until the DC voltage control unit performs control so that the voltage of the DC buses follows the DC voltage command value in accordance with a high-rank command outputted from a high-rank control system in response to stop of operation of the main power conversion device connected to the main power supply system and serving for power supply and voltage control, the DC voltage and power flow are stabilized by the capacitor voltage control by the DC capacitor voltage control unit and one of the DC voltage control by the DC voltage control unit and the DC current control by the DC current control unit.

10. The power conversion system according to claim 3, wherein during a transient period until the DC voltage control unit performs control so that the voltage of the DC buses follows the DC voltage command value in accordance with a high-rank command outputted from a high-rank control system in response to stop of operation of the main power conversion device connected to the main power supply system and serving for power supply and voltage control, the DC voltage and power flow are stabilized by the capacitor voltage control by the DC capacitor voltage control unit and one of the DC voltage control by the DC voltage control unit and the DC current control by the DC current control unit.

11. The power conversion system according to claim 4, wherein during a transient period until the DC voltage control unit performs control so that the voltage of the DC buses follows the DC voltage command value in accordance with a high-rank command outputted from a high-rank control system in response to stop of operation of the main power conversion device connected to the main power supply system and serving for power supply and voltage control, the DC voltage and power flow are stabilized by the capacitor voltage control by the DC capacitor voltage control unit and one of the DC voltage control by the DC voltage control unit and the DC current control by the DC current control unit.

12. The power conversion system according to claim 5, wherein during a transient period until the DC voltage control unit performs control so that the voltage of the DC buses follows the DC voltage command value in accordance with a high-rank command outputted from a high-rank control system in response to stop of operation of the main power conversion device connected to the main power supply system and serving for power supply and voltage control, the DC voltage and power flow are stabilized by the capacitor voltage control by the DC capacitor voltage control unit and one of the DC voltage control by the DC voltage control unit and the DC current control by the DC current control unit.

13. The power conversion system according to claim 6, wherein during a transient period until the DC voltage control unit performs control so that the voltage of the DC buses follows the DC voltage command value in accordance with a high-rank command outputted from a high-rank control system in response to stop of operation of the main power conversion device connected to the main power supply system and serving for power supply and voltage control, the DC voltage and power flow are stabilized by the capacitor voltage control by the DC capacitor voltage control unit and one of the DC voltage control by the DC voltage control unit and the DC current control by the DC current control unit.

14. The power conversion system according to claim 8, wherein during a transient period until the DC voltage control unit performs control so that the voltage of the DC buses follows the DC voltage command value in accordance with a high-rank command outputted from a high-rank control system in response to stop of operation of the main power conversion device connected to the main power supply system and serving for power supply and voltage control, the DC voltage and power flow are stabilized by the capacitor voltage control by the DC capacitor voltage control unit and one of the DC voltage control by the DC voltage control unit and the DC current control by the DC current control unit.

* * * * *